United States Patent
Munier et al.

(10) Patent No.: US 11,632,283 B2
(45) Date of Patent: Apr. 18, 2023

(54) SIGNALING OF DEMODULATION REFERENCE SIGNAL CONFIGURATION FOR UPLINK SHORT TTI TRANSMISSIONS

(71) Applicant: Telefonaktiebolaget LM Ericsson (publ), Stockholm (SE)

(72) Inventors: Florent Munier, Västra Frölunda (SE); Jingya Li, Gothenburg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 127 days.

(21) Appl. No.: 16/333,490

(22) PCT Filed: Nov. 3, 2017

(86) PCT No.: PCT/EP2017/078172
§ 371 (c)(1),
(2) Date: Mar. 14, 2019

(87) PCT Pub. No.: WO2018/083228
PCT Pub. Date: May 11, 2018

(65) Prior Publication Data
US 2019/0253300 A1    Aug. 15, 2019

Related U.S. Application Data

(60) Provisional application No. 62/418,031, filed on Nov. 4, 2016.

(51) Int. Cl.
H04L 27/26 (2006.01)
H04L 5/00 (2006.01)
H04L 1/00 (2006.01)

(52) U.S. Cl.
CPC ........ *H04L 27/2666* (2013.01); *H04L 1/0071* (2013.01); *H04L 5/0007* (2013.01);
(Continued)

(58) Field of Classification Search
None
See application file for complete search history.

(56) References Cited

U.S. PATENT DOCUMENTS

| 11,343,837 | B2* | 5/2022 | Lee | H04W 72/042 |
| 2007/0060161 | A1* | 3/2007 | Chindapol | H04W 72/042 |
| | | | | 455/450 |

(Continued)

FOREIGN PATENT DOCUMENTS

| EP | 2747320 A2 | 6/2014 |
| RU | 2445745 C1 | 3/2012 |

(Continued)

OTHER PUBLICATIONS

Qualcomm Incorporated: "UL Design for Shortened TTI", 3GPP Draft; R1-1610008 UL Design for Shortened TTI, 3rd Generation Partnership Project (3GPP), Mobile Competence Centre ; 650, Route Des Lucioles ; F-06921 Sophia-Antipolis Cedex ; France; vol. RAN WG1, No. Lisbon, Portugal (Year: 2016).*

(Continued)

*Primary Examiner* — Christopher T Wyllie
(74) *Attorney, Agent, or Firm* — Christopher & Weisberg, P.A.

(57) ABSTRACT

A method, wireless device and network node for multiplexing demodulation reference signals, DMRS, during short transmission time intervals, sTTIs. According to one aspect, a method includes generating an indication of an interleaved frequency division multiple access, IFDMA, subcarrier configuration for DMRS transmission. The method further includes transmitting to the wireless device the indication of IFDMA subcarrier configuration.

16 Claims, 21 Drawing Sheets

(52) U.S. Cl.
CPC ........ *H04L 5/0051* (2013.01); *H04L 27/2607* (2013.01); *H04L 27/2646* (2013.01)

(56) References Cited

U.S. PATENT DOCUMENTS

| | | | | |
|---|---|---|---|---|
| 2012/0281656 | A1* | 11/2012 | Hooli | H04J 11/0023 370/328 |
| 2012/0320839 | A1* | 12/2012 | Noh | H04L 1/1861 370/329 |
| 2016/0029331 | A1* | 1/2016 | Seo | H04L 27/2613 370/350 |
| 2017/0164352 | A1* | 6/2017 | Yang | H04W 16/14 |
| 2018/0288787 | A1* | 10/2018 | Hooli | H04W 74/0808 |
| 2019/0253300 | A1* | 8/2019 | Munier | H04L 27/2666 |
| 2019/0268934 | A1* | 8/2019 | Korhonen | H04L 5/0051 |
| 2020/0028723 | A1* | 1/2020 | Gao | H04L 27/26134 |
| 2021/0345304 | A1* | 11/2021 | Munier | H04W 72/042 |
| 2022/0217747 | A1* | 7/2022 | Lee | H04W 72/042 |

FOREIGN PATENT DOCUMENTS

| | | | |
|---|---|---|---|
| WO | 2006134949 | A1 | 12/2006 |
| WO | 2011047462 | A1 | 4/2011 |
| WO | 2011074807 | A1 | 6/2011 |
| WO | 2015115991 | A1 | 8/2015 |
| WO | 2016148789 | A1 | 9/2016 |

OTHER PUBLICATIONS

Release 12; 3GPP TS 36.213 V12.8.0; 3rd Generation Partnership Project; Technical Specification Group Radio Access Network; Evolved Universal Terrestrial Radio Access (E-UTRA); Physical layer procedures (Release 12); Dec. 2015; Consisting of 241 pages.
Release 14; 3GPP TS 36.213 V14.4.0; 3rd Generation Partnership Project; Technical Specification Group Radio Access Network; Evolved Universal Terrestrial Radio Access (E-UTRA); Physical layer procedures Release 14); Sep. 2017; Consisting of 462 pages.
RP-161299; 3GPP TSG RAN Meeting #72; Busan, Korea; Jun. 13-16, 2016; Consisting of 9 pages.
3rd Generation Partnership Project; Technical Specification Group Radio Access Network; Evolved Universal Terrestrial Radio Access (E-UTRA); Physical layer procedures (Release 12) 3GPP TS 36.213 V12.12.0; Sep. 2017; Consisting of 241 pages.
R1-162777; Ericsson; NB-IoT—UL Reference signals; Discussion and Decision; 3GPP TSG-RAN WG1 Meeting #84bis; Busan, Korea,; Apr. 11-15, 2016; Consisting of 8 pages.
3GPP TR 36.881 V1.0.0; 3rd Generation Partnership Project; Technical Specification Group Radio Access Network; Evolved Universal Terrestrial Radio Access (E-UTRA); Study on latency reduction techniques for LTE; Release 14; May 2016; Consisting of 248 pages.
R1-060385; Motorola; Cubic Metric in 3GPP-LTE; 3GPP TSG RAN WG1 #44; Denver, USA; Feb. 13-17, 2006; Consisting of 7 pages.
Release 13; 3rd Generation Partnership Project; Technical Specification Group Radio Access Network; Evolved Universal Terrestrial Radio Access (E-UTRA); Physical channels and modulation; 3GPP TS 36.211 V13.0.0; Dec. 2015; Consisting of 141 pages.
R1-167087; Nokia, Alcatel-Lucent Shanghai Bell; UL DMRS Base Sequences with IFDMA; Discussion and Decision; 3GPP TSG RAN WG1 Meeting #86; Gothenburg, Sweden; Aug. 22-26, 2016; Consisting of 4 pages.
Evolved Universal Terrestrial Radio Access (E-UTRA); 3rd Generation Partnership Project; Technical Specification Group Radio Access Network; Physical layer procedures; Release 13; 3GPP TS 36.213 V13.0.0; Dec. 2015;Consisting of 326 pages.
Official Action dated Nov. 18, 2019 and English language translation for Russian Patent Application No. 2019117040, consisting of 12-pages.
International Search Report and Written Opinion dated Feb. 7, 2018 for International Application No. PCT/EP2017/078172 filed on Nov. 3, 2017, consisting of 9-pages.
3GPP TSG RAN WG1 #86b R1-1610008; Title: UL Design for Shortened TTI; Agenda Item: 7.2.10.2.1; Source Qualcomm Incorporated; Document for: Discussion and Decision; Location and Date: Lisbon, Portugal Oct. 10-14, 2016, consisting of 7-pages.
3GPP TSG-RAN WG1 #86bis R1-1609849; Title: On RPF, Control Signaling, and Power Boosting for UL DMRS; Agenda Item: 7.2.2 3; Source: Ericsson; Document for: Discussion and Decision; Location and Date: Lisbon, Portugal Oct. 10-14, 2016, consisting of 3-pages.
3GPP TSG RAN WG1 Meeting #84bis R1-163173; Title: PUSCH design for shortened TTI; Agenda Item: 7.3.10.2; Source: NTT Docomo, Inc; Document for: Discussion and Decision; Location and Date: Busan, Korea Apr. 11-15, 2016, consisting of 6-pages.
3GPP TSG-RAN WG1 #87 R1-1611522; Title: Design aspects of sPUSCH; Agenda Item: 6.2.10.2.5; Source: Ericsson Document for: Discussion, Decision; Location and Date: Reno, USA Nov. 14-18, 2016, consisting of 4-pages.
EPO Communication dated Aug. 6, 2021 for Patent Application No. 17793943.6, consisting of 7-pages.
Indian Examination Report dated Nov. 5, 2020 for Application No. 201917016726, consisting of 6-pages.
3GPP TSG RAN WG1 Meeting #86 R1-166341; Title: Control Signalling for UL DMRS with IFDMA; Agenda item: 7.2.4.1.3; Source: Nokia, Alcatel-Lucent Shanghai Bell; Document for: Discussion and Decision; Location and Date: Gothenburg, Sweden Aug. 22-26, 2016, consisting of 5 pages.

\* cited by examiner

FIG. 9

| | | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| | | ///| ///| ///| R | ///| ///| ///| ///| ///| ///| R | ///| ///| S |
| sT1 | 0 | | | | R | | | | | | | | | | |
| sT1 | 1 | | | | | | | | | | | R | | | |

FIG. 10

| | | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| | | R | ///| R | ///| R | ///| ///| R | ///| R | ///| R | ///| S |
| sTT1 | 0 | R | | | | | | | | | | | | | |
| sTT1 | 1 | | | R | | | | | | | | | | | |
| sTT1 | 2 | | | | | R | | | | | | | | | |
| sTT1 | 3 | | | | | | | | R | | | | | | |
| sTT1 | 4 | | | | | | | | | | R | | | | |
| sTT1 | 5 | | | | | | | | | | | | R | | S |

FIG. 11

| | | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| | | R | ///| ///| ///| R | ///| ///| R | ///| ///| ///| R | ///| S |
| sTT1 | 0 | R | | | | | | | | | | | | | |
| sTT1 | 1 | | | | | | | | | | | | | | |
| sTT1 | 2 | | | | | R | | | | | | | | | |
| sTT1 | 3 | | | | | | | | | R | | | | | |
| sTT1 | 4 | | | | | | | | | | | | | | |
| sTT1 | 5 | | | | | | | | | | | | R | | S |

FIG. 12

SIGNALING OF DEMODULATION REFERENCE SIGNAL CONFIGURATION FOR UPLINK SHORT TTI TRANSMISSIONS

CROSS-REFERENCE TO RELATED APPLICATIONS

This application is a Submission Under 35 U.S.C. § 371 for U.S. National Stage Patent Application of International Application No.: PCT/EP2017/078172, filed Nov. 3, 2017 entitled "SIGNALING OF DEMODULATION REFERENCE SIGNAL CONFIGURATION FOR UPLINK SHORT TTI TRANSMISSIONS," which claims priority to U.S. Provisional Application No. 62/418,031, filed Nov. 4, 2016, entitled "SIGNALING OF DMRS CONFIGURATION FOR UPLINK SHORT TTI TRANSMISSIONS," the entireties of all of which are incorporated herein by reference.

TECHNICAL FIELD

This disclosure relates to wireless communications, and in particular, signaling of demodulation reference signals (DMRS) configurations for uplink short transmission time interval (sTTI) transmissions.

BACKGROUND

In third generation partnership long term evolution (3GPP LTE) systems, data transmissions in both the downlink (i.e., from a network node or base station such as an eNodeB (eNB)) to a user's wireless device (user equipment (UE)) and the uplink (from a wireless device to a network node or eNB) are organized into radio frames of 10 ms, each radio frame consisting of ten equally-sized subframes of length Tsubframe=1 ms, as shown in FIG. 1

LTE uses Orthogonal Frequency Division Multiplexing (OFDM) in the downlink and Single Carrier OFDM (SC-OFDM) in the uplink. The basic LTE downlink physical resource can thus be seen as a time-frequency grid as illustrated in FIG. 2, where each resource element corresponds to one OFDM subcarrier during one OFDM symbol interval.

Furthermore, the resource allocation in LTE is typically described in terms of resource blocks (RBs), where a resource block corresponds to one slot (0.5 ms) in the time domain and 12 contiguous subcarriers in the frequency domain. Resource blocks are numbered in the frequency domain, starting with 0 from one end of the system bandwidth.

Similarly, the LTE uplink resource grid is illustrated in FIG. 3, where $N_{RB}^{UL}$ is the number of resource blocks (RBs) contained in the uplink system bandwidth, $N_{sc}^{RB}$ is the number of subcarriers in each RB, typically $N_{sc}^{RB}=12$, $N_{symb}^{UL}$ is the number of SC-OFDM symbols in each slot. $N_{symb}^{UL}=7$ for normal cyclic prefix (CP) and $N_{symb}^{UL}=6$ for extended CP. A subcarrier and a SC-OFDM symbol forms an uplink resource element (RE).

Downlink data transmissions from an eNB to a wireless device are dynamically scheduled, i.e., in each subframe the base station transmits control information concerning which terminal's data is transmitted and upon which resource blocks the data is transmitted, in the current downlink subframe. This control signaling is typically transmitted in the first 1, 2, 3 or 4 OFDM symbols in each subframe. A downlink system with 3 OFDM symbols as control is illustrated in FIG. 4.

Similar to the downlink, uplink transmissions from a wireless device to an eNB are also dynamically scheduled through the downlink control channel. When a wireless device receives an uplink grant in subframe n, the wireless device transmits data in the uplink at subframe n+k, where k=4 for a frequency division duplex (FDD) system and k varies for time division duplex (TDD) systems.

In LTE, a number of physical channels are supported for data transmissions. A downlink or an uplink physical channel corresponds to a set of resource elements carrying information originating from higher layers, while a downlink or an uplink physical signal is used by the physical layer but does not carry information originating from higher layers.

Some of the downlink physical channels and signals supported in LTE are:
  Physical Downlink Shared Channel, PDSCH
  Physical Downlink Control Channel, PDCCH
  Enhanced Physical Downlink Control Channel, EPDCCH
  Reference signals:
  Cell Specific Reference Signals (CRS)
  DeModulation Reference Signal (DMRS) for PDSCH
  Channel State Information Reference Signals (CSI-RS)

The PDSCH is used mainly for carrying user traffic data and higher layer messages in the downlink and is transmitted in a downlink (DL) subframe outside of the control region as shown in FIG. 4. Both the PDCCH and the EPDCCH are used to carry Downlink Control Information (DCI) such as physical resource block (PRB) allocation, modulation level and coding scheme (MCS), precoder used at the transmitter, and etc. The PDCCH is transmitted in the first one to four OFDM symbols in a DL subframe, i.e., the control region, while the EPDCCH is transmitted in the same region as the PDSCH.

Some of the uplink (UL) physical channels and signals supported in LTE are:
  Physical Uplink Shared Channel, PUSCH
  Physical Uplink Control Channel, PUCCH
  Reference Signals
  DeModulation Reference Signal (DMRS) for PUSCH
  DeModulation Reference Signal (DMRS) for PUCCH The PUSCH is used to carry uplink data or/and uplink control information from the wireless device to the eNodeB. The PUCCH is used to carry uplink control information (UCI) from the wireless device to the eNodeB.

Demodulation reference symbols (DMRS) for the PUSCH is used for PUSCH demodulations. More specifically, the DMRS is used by the network node or eNB for uplink channel estimation in the RBs scheduled for the associated PUSCH. DMRS is time multiplexed with the associated PUSCH and occupies the same RBs as the PUSCH. The DMRS is transmitted on the resource elements (Res) of the $3^{rd}$ SC-OFDM symbol of each slot of a subframe as shown in FIG. 5, where only one RB is shown. It can be seen that the DMRS occupies all the subcarriers in the $3^{rd}$ symbols of each slot.

The followings are the main design goals for uplink DMRS:
  Constant amplitude over transmitted subcarriers for uniform channel excitation and estimation;
  Low peak to average power ratio (PAPR) or cubic metric (CM) in time domain for efficient Power Amplifier (PA) utilization;
  Low cross correlation between different DMRS sequences for low inter-cell interference where different sequences are used in different cells.

The above goals were achieved in LTE by using a combination of computer generated (CG) highly optimized base sequences for 1RB and 2RBs and cyclically extended Zadoff-Chu sequences for 3RBs or larger.

Let $r_{PUSCH}^{(\lambda)}(.)$ be the DMRS sequence associated with an uplink multi-input-multi-output (MIMO) layer λ, then the DMRS sequence in LTE is defined as $$r_{PUSCH}^{(\lambda)}(m_s \cdot M_{sc}^{RS}+n)=w^{(\lambda)}(m_s)r_{u,v}^{(\alpha_\lambda)}(n) \quad (1)$$

where $m_s=0,1$ corresponds to slot 0 and slot 1, respectively, as shown in FIG. 5, n=0, . . . , $M_{sc}^{RB}-1$ and $M_{sc}^{RB}=M_{sc}^{PUSCH}$ is the number of subcarriers of the RBs scheduled for the associated PUSCH. In legacy LTE, $w^{(\lambda)}$ can be configured with $[w^{(\lambda)}(0)w^{(\lambda)}(1)]=[1\ 1]$, or $[1\ -1]$ according to Table 5.5.2.1.1-1 of TS36.211, which is copied in Table 3. $\alpha^\lambda$ is a cyclic shift configured for a MIMO layer λ. The cyclic shift $\alpha_\lambda$ in a slot $n_s$ is given as $\alpha_\lambda=2\pi n_{cs,\lambda}/12$ with $$n_{cs,\lambda}(n_{DMRS}^{(1)}+n_{DMRS,\lambda}^{(2)}+n_{PN}(n_s)) \bmod 12 \quad (2)$$

where the values of $n_{DMRS}^{(1)}$ are configured by higher layers, $n_{DMRS,\lambda}^{(2)}$ is given by the cyclic shift for the DMRS field in most recent uplink-related DCI for the transport block associated with the corresponding PUSCH transmission: where the value of $n_{DMRS,\lambda}^{(2)}$, is given in Table 5.5.2.1.1-1 of technical standard TS36.211, which is copied in Table 3. $n_{PN}(n_s)$ is a cell specific number generated pseudo-randomly in a slot by slot basis. $n_s \in \{(0,1,\ldots,9\}$ is the slot index within a subframe. $r_{u,v}^{(\alpha)}(n)$ is a reference signal sequence and is defined by a cyclic shift α of a base sequence $\bar{r}_{u,v}(n)$ according to $$r_{u,v}^{(\alpha)}(n)=e^{j\alpha n}(n), 0 \leq n \leq M_{sc}^{RS} \quad (3)$$

where $M_{sc}^{RS}=mN_{sc}^{RB}$ is the length of the reference signal sequence and m is the number of RBs scheduled for the PUSCH. Multiple reference signal sequences are defined from a single base sequence $\bar{r}_{u,v}(n)$ through different values of a.

Base sequences $\bar{r}_{u,v}(n)$ are divided into groups, where $u \in \{0,1,\ldots,29\}$ is the group number and v is the base sequence number within the group. So there are 30 groups of base sequences for each sequence length. For $M_{sc}^{RS}=mN_{sc}^{RB}$, $1 \leq m \leq 5$, each group contains one base sequence (v=0). For $M_{sc}^{RS}=mN_{sc}^{RB}$, $m \geq 6$, there are two base sequences (v=0,1) in each group.

The definition of the base sequence $\bar{r}_{u,v}(0), \ldots, \bar{r}_{u,v}(M_{sc}^{RB}-1)$ depends on the sequence length $MR_{sc}^{RB}$. For base sequences of length $3N_{sc}^{RB}$ or larger, $\bar{r}_{u,v}(n)$ is generated through cyclic extension of a Zadoff-Chu (ZC) sequence $x_q(m)$ as follows $$\bar{r}_{u,v}(n)=x_q(n \bmod N_{ZC}^{RS}), 0 \leq n < M_{sc}^{RB} \quad (4)$$

where the $q^{th}$ root Zadoff-Chu sequence is defined by $$x_q(m)=e^{-j\frac{\pi q m(m+1)}{N_{ZC}^{RS}}}, 0 \leq m \leq N_{ZC}^{RS}-1 \quad (5)$$

with q given by $$q=\lfloor \bar{q}+\frac{1}{2} \rfloor + v \cdot (-1)^{\lfloor 2\bar{q} \rfloor}$$

$$\bar{q}=N_{ZC}^{RS} \cdot (u+1)/31$$

The length $N_{ZC}^{RS}$ of the Zadoff-Chu sequence is given by the largest prime number such that $N_{ZC}^{RS} < M_{sc}^{RS}$.

By using cyclic extension of the Zadoff-Chu sequences, the base sequences have a constant amplitude over frequency and also maintain the zero auto-correlation cyclic shift orthogonality property of the Zadoff-Chu sequences, which allows generating multiple orthogonal sequences by using different cyclic shifts on a single base sequence. Using extension, not truncation, in general provides better CM for 3 and more RBs. In addition, at least 30 base sequences can be generated this way.

For one and two RBs, however, only a small number of low CM extended Zadoff-Chu sequences are available. To achieve similar inter-cell interference randomization as in the case of 3 or more PRBs, 30 base sequences are desirable. Thus, base sequences for one and two RBs were obtained by computer searches. Only quadrature phase shift keying (QPSK) based sequences were selected to reduce memory size for storage and computational complexity. The base sequences for one and two RBs (i.e. $M_{sc}^{RS}=M_{sc}^{RB}$ and $M_{sc}^{RS}=2NM_{sc}^{RB}$) are defined as $$\bar{r}_{u,v}(n)=e^{j\varphi(n)\pi/4}, 0 \leq n \leq M_{sc}^{RS}-1 \quad (6)$$

where the value of Q(n) is given by Table 1 for $M_{sc}^{RS}=N_{sc}^{RB}$ and by Table 2 for $M_{sc}^{RS}=2NR_{sc}^{RB}$.

TABLE 1

| u | φ(0), . . . , φ(11) |
|---|---|
| 0 | −1  1  3 −3  3  3  1  1  3  1 −3  3 |
| 1 |  1  1  3  3  3 −1  1 −3 −3  1 −3  3 |
| 2 |  1  1 −3 −3 −3 −1 −3 −3  1 −3  1 −1 |
| 3 | −1  1  1  1  1 −1 −3 −3  1 −3  3 −1 |
| 4 | −1  3  1 −1  1 −1 −3 −1  1 −1  1  3 |
| 5 |  1 −3  3 −1 −1  1  1 −1 −1  3 −3  1 |
| 6 | −1  3 −3 −3 −3  3  1 −1  3  3 −3  1 |
| 7 | −3 −1 −1 −1  1 −3  3 −1  1 −3  3  1 |
| 8 |  1 −3  3  1 −1 −1 −1  1  1  3 −1  1 |
| 9 |  1 −3 −1  3  3 −1 −3  1  1  1  1  1 |
| 10 | −1  3 −1  1  1 −3 −3 −1 −3  3 −1 |
| 11 |  3  1 −1 −1  3  3 −3  1  3  1  3  3 |
| 12 |  1 −3  1  1 −3  1  1  1 −3 −3 −3  1 |
| 13 |  3  3 −3  3 −3  1  1  3 −1 −3  3  3 |
| 14 | −3  1 −1 −3 −1  3  1  3  3  3 −1  1 |
| 15 |  3 −1  1 −3 −1 −1  1  1  3  1 −1 −3 |
| 16 |  1  3  1 −1  1  3  3  3 −1 −1  3 −1 |
| 17 | −3  1  1  3 −3  3 −3 −3  3  1  3 −1 |
| 18 | −3  3  1  1 −3  1 −3 −3 −1 −1  1 −3 |
| 19 | −1  3  1  3  1 −1 −1  3 −1 −3 −1 |
| 20 | −1 −3  1  1  1  1  3  1 −1  1 −3 −1 |
| 21 | −1  3 −1  1 −3 −3 −3 −3 −3  1 −1 −3 |
| 22 |  1  1 −3 −3 −3 −3 −1  3 −3  1 −3  3 |
| 23 |  1  1 −1 −3 −1 −3  1 −1  1  3 −1  1 |
| 24 |  1  1  3  1  3  3 −1  1 −1 −3 −3  1 |
| 25 |  1 −3  3  3  1  3  3  1 −3 −1 −1  3 |
| 26 |  1  3 −3 −3  3 −3  1 −1 −1  3 −1 −3 |
| 27 | −3 −1 −3 −1 −3  3  1 −1  1  3 −3 −3 |
| 28 | −1  3 −3  3 −1  3  3 −3  3  3 −1 −1 |
| 29 |  3 −3 −3 −1 −1 −3 −1  3 −3  3  1 −1 |

TABLE 2

| u | φ(0), . . . , φ(23) |
|---|---|
| 0 | −1  3  1 −3  3 −1  1  3 −3  3  1  3 −3  3  1  1 −1  1  3 −3  3 −3 −1 −3 |
| 1 | −3  3 −3 −3 −3  1 −3 −3  3 −1  1  1  1  3  1 −1  3 −3 −3  1  3  1  1 −3 |
| 2 |  3 −1  3  3  1  1 −3  3  3  3  3  1 −1  3 −1  1  1 −1 −3 −1 −1  1  3  3 |

TABLE 2-continued

| u | $\varphi(0), \ldots, \varphi(23)$ |
|---|---|
| 3 | -1 -3 1 1 3 -3 1 1 -3 -1 -1 1 3 1 3 1 -1 3 1 1 -3 -1 -3 -1 |
| 4 | -1 -1 -1 -3 -3 -1 1 1 3 3 -1 3 -1 1 -1 -3 1 -1 -3 1 -3 -1 -1 |
| 5 | -3 1 1 3 -1 1 3 1 -3 1 -3 1 1 -1 -1 3 -1 -3 3 -3 -3 -3 1 1 |
| 6 | 1 1 -1 -1 3 -3 -3 3 -3 1 -1 -1 1 -1 1 1 -1 -3 -1 1 -1 3 -1 -3 |
| 7 | -3 3 3 -1 -1 -3 -1 3 1 3 1 3 1 1 -1 3 1 -1 1 3 -3 -1 -1 1 |
| 8 | -3 1 3 -3 1 -1 -3 3 -3 3 -1 -1 -1 -1 1 -3 -3 -3 1 -3 -3 -3 1 -3 |
| 9 | 1 1 -3 3 3 -1 -3 -1 3 -3 3 3 3 -1 1 1 -3 1 -1 1 1 -3 1 1 |
| 10 | -1 1 -3 -3 3 -1 3 -1 -1 -3 -3 -3 -1 -3 -3 1 -1 1 3 3 -1 1 -1 3 |
| 11 | 1 3 3 -3 -3 1 3 1 -1 -3 -3 -3 3 3 -3 3 3 -1 -3 3 -1 1 -3 1 |
| 12 | 1 3 3 1 1 1 -1 -1 1 -3 3 -1 1 1 -3 3 3 -1 -3 3 -3 -1 -3 -1 |
| 13 | 3 -1 -1 -1 -1 -3 -1 3 3 1 -1 1 3 3 3 -1 1 1 -3 1 3 -1 -3 3 |
| 14 | -3 -3 3 1 3 1 -3 3 1 3 1 1 3 3 -1 -1 1 -3 -1 3 1 1 3 |
| 15 | -1 -1 1 -3 1 3 -3 1 -1 -3 -1 3 1 3 1 -1 -3 -3 -1 -1 -3 -3 -3 -1 |
| 16 | -1 -3 3 -1 -1 -1 -1 1 1 -3 3 1 3 3 1 -1 1 -3 1 -3 1 1 -3 -1 |
| 17 | 1 3 -1 3 3 -1 -3 1 -1 -3 3 3 3 -1 1 1 3 -1 -3 -1 3 -1 -1 -1 |
| 18 | 1 1 1 1 1 -1 3 -1 -3 1 1 3 -3 1 -3 -1 1 1 -3 -3 3 1 1 -3 |
| 19 | 1 3 3 1 -1 -3 3 -1 3 3 3 -3 1 -1 1 -1 -3 -1 1 3 -1 3 -3 -3 |
| 20 | -1 -3 3 -3 -3 -3 -1 -1 -3 -1 -3 3 1 3 -3 -1 3 -1 1 -1 3 -3 1 -1 |
| 21 | -3 -3 1 1 -1 1 -1 1 -1 3 1 -3 -1 1 -1 1 -1 -1 3 3 -3 -1 1 -3 |
| 22 | -3 -1 -3 3 1 -1 -3 -1 -3 -3 3 -3 3 -3 -1 3 1 -3 1 3 3 -1 -3 |
| 23 | -1 -1 -1 -1 3 3 3 1 3 3 -3 1 3 -1 3 -1 3 3 -3 3 1 -1 3 3 |
| 24 | 1 -1 3 3 -1 -3 3 -3 -1 -1 3 -1 3 -1 -1 1 1 1 1 -1 -1 -3 -1 3 |
| 25 | 1 -1 1 -1 3 -1 3 1 1 -1 -1 -3 1 1 -3 1 3 -3 1 1 -3 -3 -1 -1 |
| 26 | -3 -1 1 3 1 1 -3 -1 -1 -3 3 -3 3 1 -3 3 -3 1 -1 1 -3 1 1 1 |
| 27 | -1 -3 3 3 1 1 3 -1 -3 -1 -1 -1 3 1 -3 -3 -1 3 -3 -1 -3 -1 -3 -1 |
| 28 | -1 -3 -1 -1 1 -3 -1 -1 1 -1 -3 1 1 -3 1 -3 -3 3 1 1 -1 3 -1 -1 |
| 29 | 1 1 -1 -1 -3 -1 3 -1 3 -1 1 3 1 -1 3 1 3 -3 -3 1 -1 -1 1 3 |

It should be noted that a phase shift of a reference signal sequence does not change its peak to average power ration (PAPR) or CM. Also, the magnitude of a reference signal sequence's autocorrelation or cross correlation with other reference signal sequences does not change if the reference signal is phase shifted. Therefore, a reference signal $\bar{r}'_{u,v}(n) = e^{j\zeta}\bar{r}_{u,v}(n)$ is equivalent to $\bar{r}_{u,v}(n)$, where $\zeta$ is a real number.

A given reference sequence $\bar{r}_{u,v}(n)$ with sequence number u (for example, corresponding to a row in Tables 1 and 2 will have a given value of PAPR or CM. Also, a sequence $\bar{r}_{u_1,v}(n)$ with sequence number $u_1$ and a sequence $\bar{r}_{u_2,v}(n)$ with sequence number $u_2$ will have some cross-correlation $c_{u_1,u_2}(l_1,l_2)$, where $l_1$ and $l_2$ are correlation lags. Good reference signal sequences should have low PAPR or CM and low cross-correlation.

The CM for a signal, v(t), with 3.84 MHz nominal bandwidth is defined according to $$CM = \frac{20\log_{10}\{rms[v_{norm}^3(t)]\} - 1.52}{1.56} dB \quad (7)$$

where $20 \log_{10}\{rms[v_{norm}^3(t)]\}$ is called raw cubic metric (in dB) of the signal, and $$rms(x) = \sqrt{\frac{(x'x)}{N}}, \quad v_{norm}(t) = \frac{|v(t)|}{rms[v(t)]}.$$

This definition is used in the CM calculations in the following sections.

For a set of DMRS base sequences $\{r_{u,v}(n), n=0,1, \ldots, M_{sc}-1\}$, the cross correlation between two sequences $r_{u1,v1}(n)$ and $r_{u2,v2}(n)$ is defined as $$\rho_{12} = \frac{1}{M_{sc}}\left|\sum_{n=0}^{M_{sc}-1} r_{u1,v1}(n) \cdot conj(r_{u2,v2}(n))\right| \quad (8)$$

An uplink grant can be sent using either DCI format 0 or DCI format 4, depending on the uplink transmission mode configured. For wireless devices supporting uplink MIMO transmission, DCI format 4 is used. Otherwise, DCI format 0 is used. When MIMO is supported in the uplink, a separate DMRS sequence is needed for each MIMO layer. Up to 4 layers are supported in uplink MIMO in LTE, thus up to four DMRS sequences are needed. The cyclic shifts and orthogonal cover codes (OCC) are dynamically signaled in DCI format 0 or DCI format 4 through a Cyclic Shift Field of 3 bits. This field is used to indicate a cyclic shift parameter, $n_{DMRS}^{(2)}$, $\lambda$, and a length 2 OCC code, $w^\lambda$, where $\Delta=0, 1, \ldots, v-1$ and v is the number of layers to be transmitted in the PUSCH scheduled by the DCI. The exact mapping is shown in Table 5.5.2.1.1-1 of 3GPP specification 36.211, which has been copied in Table 3 below.

TABLE 3

| Cyclic Shift Field in uplink-related DCI format | $n_{DMRS,\lambda}^{(2)}$ | | | | $[w^{(\lambda)}(0) \; w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

For a given PUSCH scheduling bandwidth in an uplink subframe, up to 8 orthogonal DMRS sequences, each with a unique cyclic shift, are available. These sequences can be used to support uplink MIMO transmission with 4 layers (which is the maximum number layers that are supported in uplink in LTE), each assigned with one cyclic shift, or uplink multi-user MIMO (MU-MIMO) for up to 8 wireless devices, each with one MIMO layer.

However, since DMRS sequences with different lengths are generally not orthogonal, wireless devices with different PUSCH bandwidth cannot generally be scheduled together for MU-MIMO transmission. In LTE Release 10, OCC2 was introduced between two DMRS symbols in two slots of an uplink subframe, i.e. $[w^{(\lambda)}(0) \ w^{(\lambda)}(1)]=[1 \ 1]$ or $[1 \ -1]$, so that two wireless devices with partially overlapped PUSCH bandwidth can be paired for MU-MIMO. To support more wireless devices with partially overlapped PUSCH bandwidth for MU-MIMO transmission in the uplink, it has been agreed that Interleaved Frequency Division Multiplexing (IFDMA) with repetition factor (RPF) 2 for uplink DMRS for the PUSCH will be introduced in LTE Release 14, in which uplink DMRS is transmitted on only half of the subcarriers, either even numbered or odd numbered subcarriers. An example of IFDMA with 2 RBs is shown in FIG. 6, where a DMRS for one wireless device can be assigned on the DMRS resource elements (REs) at even numbered subcarriers while a DMRS for another wireless device can be assigned on the other half of subcarriers, i.e., DMRS REs at odd numbered subcarriers. Since the two DMRS sequences are transmitted on different subcarriers, they are orthogonal to each other. In this example, the length of each of the two DMRS sequences is 12 and thus, the existing length 12 (i.e. $M_{sc}^{RS}=12$) base sequence $\bar{r}_{u,v}(n)$ can be used.

If only the existing base sequences $\bar{r}_{u,v}(n)$ are used for IFDMA with RPF=2, then the wireless devices need to be scheduled in a granularity of 2 RBs, which restricts resource allocation options in the network, and may lead to reduced data throughput when MU-MIMO wireless devices are scheduled. It has been agreed that new sequences will be introduced in Release 14 in order to support scheduling of also odd number of RBs greater than 3 RBs. The new sequences will be generated from cyclic extension of Zadoff-Chu sequences, as is done previously.

However, it is still to be determined whether new sequences with length 6, 18 and 30 are supported in LTE Release 14 in order to support scheduling with 1 RB, 3 RBs and 5 RBs for IFDMA with RPF=2, respectively. The main reason is that for these sequence lengths, it is not possible to generate 30 base sequences with cyclic extension of Zadoff-Chu sequences.

Using truncated Zadoff-Chu sequences was proposed for generating the length 30 base sequences for uplink DMRS, in which a length 31 Zadoff-Chu sequence is truncated by dropping either the first or the last entry of the sequence. A set of 30 base sequences have been proposed for length 18 sequences through computer search.

For length 6 sequences, it has been proposed to reuse a set of 14 length-6 sequences that was agreed to be introduced for Narrow Band Internet of Things (NB-IOT) in LTE Release 14. The set of 14 length-6 sequences is a subset of the 16 sequences and is shown in Table 4 below.

TABLE 4

| μ | $\varphi(0)$, | $\varphi(1)$, | $\varphi(2)$, | $\varphi(3)$, | $\varphi(4)$, | $\varphi(5)$, |
|---|---|---|---|---|---|---|
| 0 | 1 | 1 | 1 | 1 | 3 | −3 |
| 1 | 1 | 1 | 1 | 3 | 1 | −3 | 3 |

TABLE 4-continued

| μ | $\varphi(0)$, | $\varphi(1)$, | $\varphi(2)$, | $\varphi(3)$, | $\varphi(4)$, | $\varphi(5)$, |
|---|---|---|---|---|---|---|
| 2 | 1 | −1 | −1 | −1 | 1 | −3 |
| 3 | 1 | −1 | 3 | −3 | −1 | −1 |
| 4 | 1 | 3 | 1 | −1 | −1 | 3 |
| 5 | 1 | −3 | −3 | 1 | 3 | 1 |
| 6 | −1 | −1 | 1 | −3 | −3 | −1 |
| 7 | −1 | −1 | −1 | 3 | −3 | −1 |
| 8 | 3 | −1 | 1 | −3 | −3 | 3 |
| 9 | 3 | −1 | 3 | −3 | −1 | 1 |
| 10 | 3 | −3 | 3 | −1 | 3 | 3 |
| 11 | −3 | 1 | 3 | 1 | −3 | −1 |
| 12 | −3 | 1 | −3 | 3 | −3 | −1 |
| 13 | −3 | 3 | −3 | 1 | 1 | −3 |

In some cases, optimizing for minimum CM or peak to average power ratio (PAPR) or for low correlation magnitudes may not be essential. This design flexibility can be used to improve compatibility with "RPF=1" Rel-13 wireless devices that transmit DMRS without repetition or IFDMA.

First, we recall that IFDMA wireless devices using RPF=2 transmit their sequence on every other subcarrier, as described above. More generally, IFDMA with D repetitions ('RPF=D'), can be written as follows. Note that D=2 for the case with RPF=2.

$$re(Dk,l)=r'_{u,v}{}^{(\alpha)} \quad (9)$$

re(Dk,l) is a resource element with subcarrier index Dk in uplink SC-OFDM symbol l.

$r'_{u,v}{}^{(\alpha)}(n)$ is the $n^{th}$ element of a new DMRS reference sequence to be used for RPF=D with group index u and sequence index v with cyclic shift α.

If the RPF=D wireless devices use the same reference sequence element values on their occupied resource elements as the Rel-13 wireless devices do, then cyclic shift orthogonality can be maintained for all provided that the RPF=D sequence length is at least length 12. Then the new RPF=D sequence $r'_{u,v}(n)$ can be defined as a decimated version of the Rel-13 DMRS sequence, which can be expressed:

$$r'_{u,v}(n)=r_{u,v}(Dn+\Delta_r) \quad (10)$$

Where $r_{u,v}(n)$ is the $n^{th}$ element of the Rel-13 DMRS base sequence with group index u, group sequence index v.

$\Delta_r \in \{0, 1, \ldots, D\}$ is an offset used to select which portion of the Rel-13 DMRS base sequence is used.

An example is shown in FIG. 7, where wireless device 1 is a new wireless device with IFDMA and wireless device 2 is a legacy wireless device.

The new reference symbol sequence for RPF=D with cyclic shift is then determined somewhat differently than for Rel-13 using the following equation. Note that a factor of D is used in the exponent so that the Rel-13 and new reference signal have the same values when mapped to the same subcarriers.

$$r'_{u,v}{}^{(\alpha)}(n)=e^{jD\alpha n}r'_{u,v}(n), 0 \leq n < M'_{sc}{}^{RB} \quad (11)$$

Where $M'_{sc}{}^{RS}=\lfloor M_{sc}{}^{RS}/D \rfloor$ is the length of the new reference signal sequence and $M_{sc}{}^{RS}$ is the length of the Rel-13 sequence from which it is decimated.

The RPF=D sequence may alternatively be constructed by setting elements of the Rel-13 sequence to zero, and transmitting the modified sequence in the same REs as the Rel-13 sequence. This RE mapping can be expressed:

$$re(k, l) = \begin{cases} r_{u,v}^{(\alpha)}(n); & k = \lfloor n/D \rfloor + \Delta_r \\ 0; & \text{otherwise} \end{cases} \quad (12)$$

Where $r_{u,v}^{(\alpha)}(n)$ is the $n^{th}$ element of a Rel-13 DMRS reference sequence with group index u and group sequence index v with cyclic shift $\alpha$.

$\Delta_r \in \{0, 1, \ldots, D\}$ is an offset used to select which portion of the Rel-13 DMRS subcarriers are nonzero and contain values of the Rel-13 sequence.

The approach can be extended to scenarios where a new wireless device configured with IFDMA may be paired with more than one legacy wireless devices, each occupying a different part of the bandwidth scheduled for the new wireless device. An example is shown in FIG. 8. In this case, the base sequence for the new wireless device may be a decimated version of the two base sequences associated with the two legacy wireless devices.

Packet data latency is one of the performance metrics that vendors, operators and also end-users (via speed test applications) regularly measures. Latency measurements are done in all phases of a radio access network system lifetime, when verifying a new software release or system component, when deploying a system and when the system is in commercial operation.

Shorter latency than previous generations of 3GPP RATs was one performance metric that guided the design of Long Term Evolution (LTE). LTE is also now recognized by the end-users to be a system that provides faster access to internet and lower data latencies than previous generations of mobile radio technologies.

Packet data latency is important not only for the perceived responsiveness of the system, it is also a parameter that indirectly influences the throughput of the system. Hypertext transfer protocol/transmission control protocol (HTTP/TCP) is the dominating application and transport layer protocol suite used on the Internet today. According to HTTP Archive (http://httparchive.org/trends.php) the typical size of HTTP based transactions over the Internet are in the range of a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP based data transactions.

Radio resource efficiency can be positively impacted by latency reductions. Lower packet data latency could increase the number of transmissions possible within a certain delay bound; hence, higher Block Error Rate (BLER) targets could be used for data transmissions, freeing up radio resources and potentially improving the capacity of the system.

One approach to latency reduction is the reduction of transport time of data and control signaling, by addressing the length of a transmission time interval (TTI). By reducing the length of a TTI and maintaining the bandwidth, the processing time at the transmitter and the receiver nodes is also expected to be reduced, due to less data to process within the TTI. As described above, in LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix. In LTE release 14, a study item on latency reduction has been conducted, with the goal of specifying transmissions with shorter TTIs, such as a slot or a few symbols. A work item with the goal of specifying short TTI (sTTI) started in August 2016.

An sTTI can be decided to have any duration in time and comprises resources on a number of OFDM or SC-FDMA symbols within a 1 ms SF. As one example shown in FIG. 9, the duration of the uplink short TTI is 0.5 ms, i.e. seven SC-FDMA symbols for the case with normal cyclic prefix. As another example shown in FIG. 10, the durations of the uplink short TTIs within a subframe are of 2 or 3 symbols. Here, the "R" in the figures indicate the DMRS symbols, and "S" indicate the sounding reference signal (SRS) symbols.

Throughout this written description, short PDSCH (sPDSCH) and short PUSCH (sPUSCH) are used to denote the downlink and uplink physical shared channels with sTTIs, respectively.

In order to reduce the DMRS overhead, in LTE Release 14, it has been agreed that DMRS multiplexing/sharing should be supported for uplink short TTI transmissions. More specifically, based on the outcome of a study item on latency reduction, the following are recommended to be supported for the design of DMRS for sPUSCH:

For the case of 1-slot TTI length, reuse the current DMRS

For the case of less than 1-slot TTI length, support DMRS sharing/multiplexing of consecutive TTIs from one or multiple wireless devices. The DMRS symbols may be shared/multiplexed between sTTIs, e.g. DMRS symbols as shown in FIGS. 9 to 11.

At least 2 contiguous TTIs can be shared/multiplexed.

When the same wireless device is scheduled on consecutive sTTIs, an effective way to reduce the overhead of reference signals for UL data transmission is DMRS sharing. This means that the DMRS is not transmitted in each sTTI. Instead, a certain periodicity in terms of the number of sTTIs is assumed for transmitting DMRS. FIG. 11 illustrates an example of DMRS sharing for the case of a 2/3-symbol sTTI configuration in an uplink subframe. In this example, DMRS transmitted in sTTI 0 and sTTI 3 are used for the channel estimation for sTTI 1 and sTTI 4, respectively.

In case different wireless devices are scheduled in consecutive short TTIs, DMRS sharing cannot be used. Instead, to reduce the DMRS overhead for UL data transmissions, DMRS multiplexing can be considered. DMRS multiplexing means multiple wireless devices share the same SC-FDMA symbol but have separate SC-FDMA symbols for the data. FIG. 12 illustrates examples of DMRS multiplexing for two different 2/3-symbol sTTI configurations within an uplink subframe. The DMRS from different wireless devices are multiplexed in the same SC-FDMA symbol marked with "R". The orthogonality between the multiplexed DMRS from different wireless devices needs to be ensured in order to guarantee good channel estimation and successful data decoding.

For uplink sTTI transmissions, DMRS multiplexing/sharing can be used to reduce the DMRS overhead. With the same frequency allocation, the DMRS of different wireless devices can be multiplexed on the same SC-FDMA symbol by using different cyclic shifts.

In order to keep the scheduling flexibility, different wireless devices can be allocated with different frequency resources, where part of their frequency allocation is overlapped, as shown in FIG. 13, where reference symbol 2 is for a first wireless device 1 (WD1), reference symbol 4 is for a second wireless device (WD2), data 6 is for WD1 and data 8 is for WD2. DMRS multiplexing should also be supported in this partially overlapped frequency allocation case to reduce the DMRS overhead, and at the same time, keep the scheduling flexibility.

The IFDMA-based DMRS multiplexing method discussed above for MU-MIMO transmission on PUSCH can also be used for supporting DMRS multiplexing on sPUSCH with partially overlapped frequency allocations.

Different from DMRS multiplexing for MU-MIMO transmissions on PUSCH, in most cases, there is at most one DMRS symbol per sPUSCH transmission. This implies that OCC cannot be used for DMRS multiplexing when considering sPUSCH transmissions. A new signaling method needs to be designed in order to support IFDMA-based DMRS multiplexing for sPUSCH transmissions with partially overlapped frequency allocation.

SUMMARY

Some embodiments advantageously provide a method and network node for signaling demodulation reference symbols, DMRS, configurations of uplink short transmission time interval, sTTI, transmissions, the signaling supporting multiplexing of DMRS of different wireless devices for uplink sTTIs.

According to one aspect, a method in a network node for configuring a wireless device for multiplexing demodulation reference signals (DMRS) during short transmission time intervals (sTTIs) is provided. The method includes generating an indication of an interleaved frequency division multiple access (IFDMA) subcarrier configuration for DMRS transmission. The further includes transmitting to the wireless device the indication of IFDMA subcarrier configuration.

According to this aspect, in some embodiments, the indication of the IFDMA subcarrier configuration specifies which subcarriers are to be used for DMRS transmission. In some embodiments, the indication of the IFDMA subcarriers is contained in downlink control information (DCI). In some embodiments, the IFDMA subcarrier configuration is indicated by a field indicating a cyclic shift. In some embodiments, the method further includes indicating whether a DMRS configuration is an IFDMA-based DMRS configuration. In some embodiments, a sTTI is one of 2 and 3 symbols duration. In some embodiments, the IFDMA has a repetition factor of 2. In some embodiments, a sTTI transmission is a short physical uplink shared channel, sPUSCH, transmission. In some embodiments, the method further includes determining one of whether only IFDMA-based DMRS multiplexing is used for sTTIs and whether both cyclic shift-based DMRS multiplexing and IFDMA-based DMRS multiplexing are used for sTTIs.

According to another aspect, a network node for configuring a wireless device for multiplexing demodulation reference signals (DMRS) during short transmission time intervals (sTTIs) is provided. The network node includes processing circuitry configured to generate an indication of an interleaved frequency division multiple access (IFDMA) subcarrier configuration for DMRS transmission. The network node further includes a transceiver configured to transmit to the wireless device the indication of IFDMA, subcarrier configuration.

According to this aspect, in some embodiments, the indication of the IFDMA subcarrier configuration specifies which subcarriers are to be used for DMRS transmission. In some embodiments, the indication of the IFDMA subcarriers is contained in downlink control information, DCI. In some embodiments, the IFDMA subcarrier configuration is indicated by a field indicating a cyclic shift. In some embodiments, the processing circuitry is further configured to indicate whether a DMRS configuration is an IFDMA-based DMRS configuration. In some embodiments, a sTTI is one of 2 and 3 symbols duration. In some embodiments, the IFDMA has a repetition factor of 2. In some embodiments, a sTTI transmission is a short physical uplink shared channel, sPUSCH, transmission. In some embodiments, the processing circuitry is further configured to determine one of whether only IFDMA-based DMRS multiplexing is used for sTTIs and whether both cyclic shift-based DMRS multiplexing and IFDMA-based DMRS multiplexing are used for sTTIs.

According to yet another aspect, a network node for configuring a wireless device for multiplexing demodulation reference signals (DMRS) during short transmission time intervals (sTTIs) is provided. The network node includes an IFDMA determination module configured to generate an indication of an interleaved frequency division multiple access (IFDMA), subcarrier configuration for DMRS transmission. The network node further includes a transceiver module configured to transmit to the wireless device the indication of IFDMA, subcarrier configuration.

According to another aspect, a method in a wireless device for configuring demodulation reference signals (DMRS) during short transmission time intervals (sTTIs) is provided. The method includes receiving from a network node an indication of an interleaved frequency division multiple access (IFDMA) subcarrier configuration for DMRS transmission. The method further include configuring DMRS transmissions according to the indication.

According to this aspect, in some embodiments, the indication of the IFDMA subcarrier configuration specifies which subcarriers are to be used for DMRS transmission. In some embodiments, the IFDMA subcarrier configuration is indicated by a field indicating a cyclic shift.

According to yet another aspect, a wireless device for multiplexing demodulation reference signals (DMRS) during short transmission time intervals (sTTIs) is provided. The wireless device includes a transceiver configured to receive from a network node an indication of an interleaved frequency division multiple access (IFDMA) subcarrier configuration for DMRS transmission. The wireless device further includes processing circuitry configured to configure DMRS transmissions according to the indication.

According to this aspect, in some embodiments, the indication of the IFDMA subcarrier configuration specifies which subcarriers are to be used for DMRS transmission. In some embodiments, the IFDMA subcarrier configuration is indicated by a field indicating a cyclic shift.

According to another aspect, a wireless device for multiplexing demodulation reference signals (DMRS) during short transmission time intervals (sTTIs) is provided. The wireless device includes a transceiver module configured to receive from a network node an indication of an interleaved frequency division multiple access, IFDMA, subcarrier configuration for DMRS transmission. The wireless device further includes a DMRS configuration module configured to configure DMRS transmissions according to the indication.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 9 is diagram of sTTIs;
FIG. 10 is a diagram of sTTIs;
FIG. 11 is a diagram of sTTIs;
FIG. 12 is a diagram of sTTIs.

DETAILED DESCRIPTION

Figure 1:
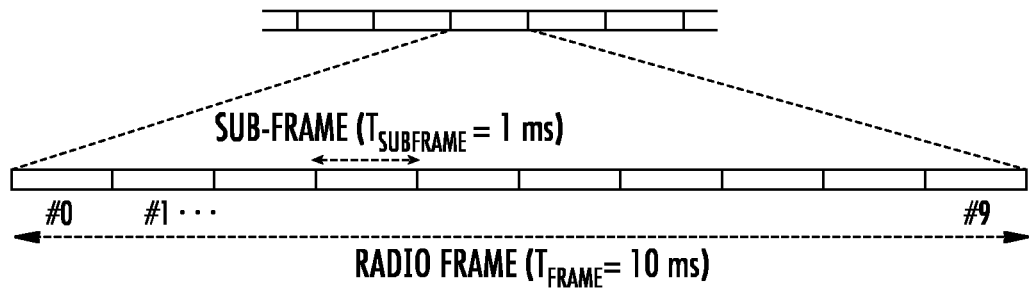
FIG. 1 is a timing diagram of a radio frame.
Figure 2:
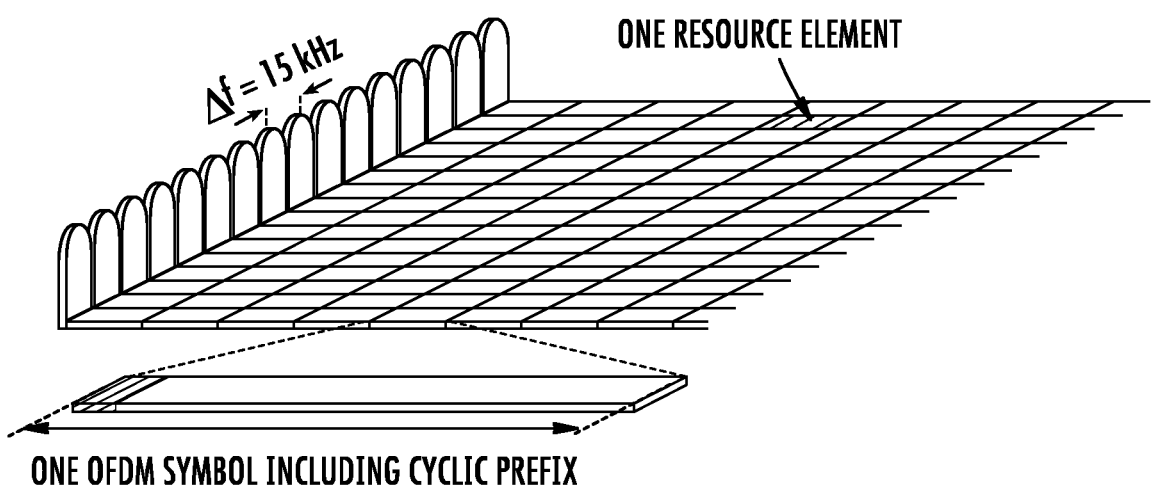
FIG. 2 is a diagram of resource elements.
Figure 3:
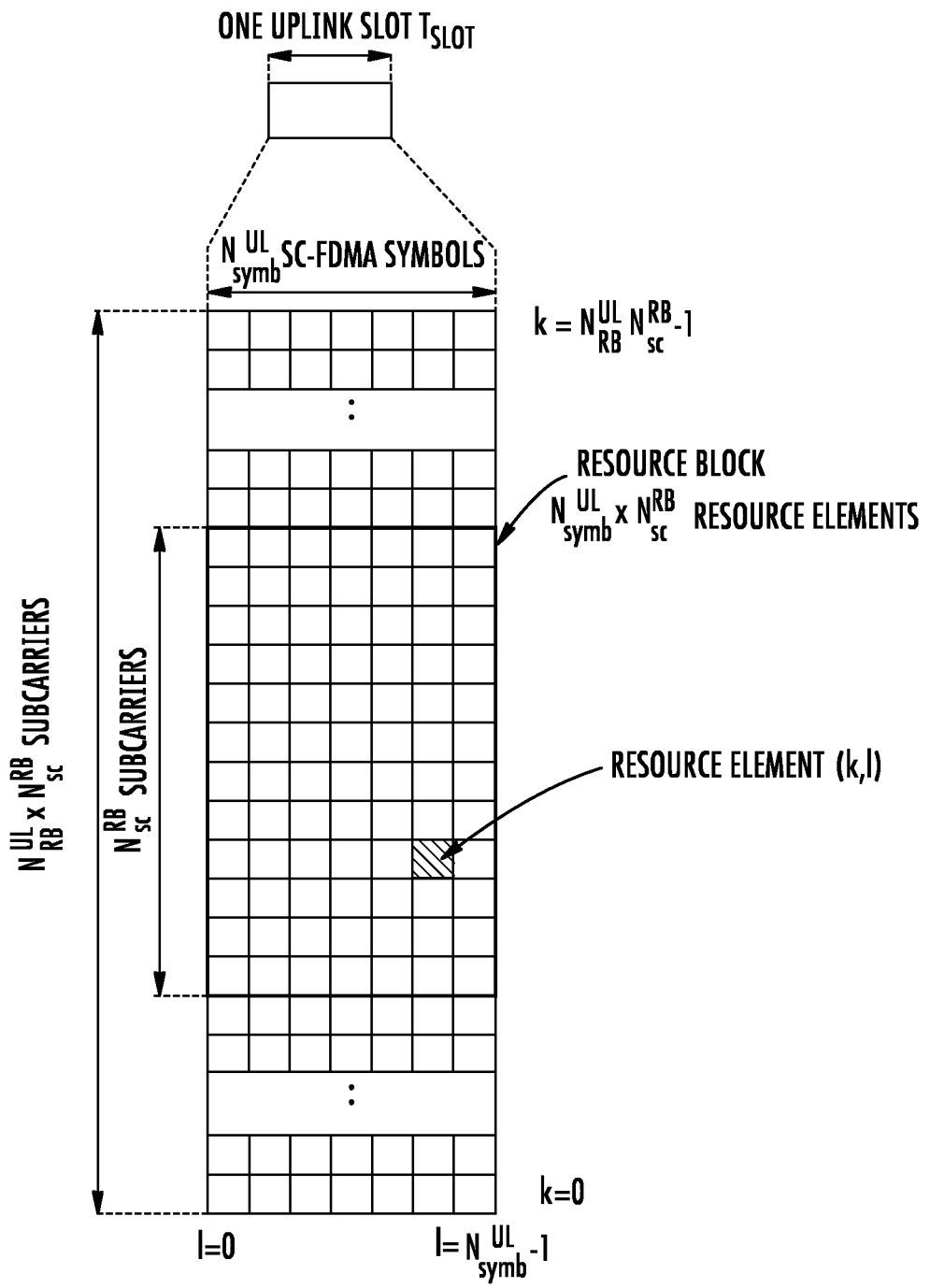
FIG. 3 is an LTE uplink resource gird.
Figure 4:
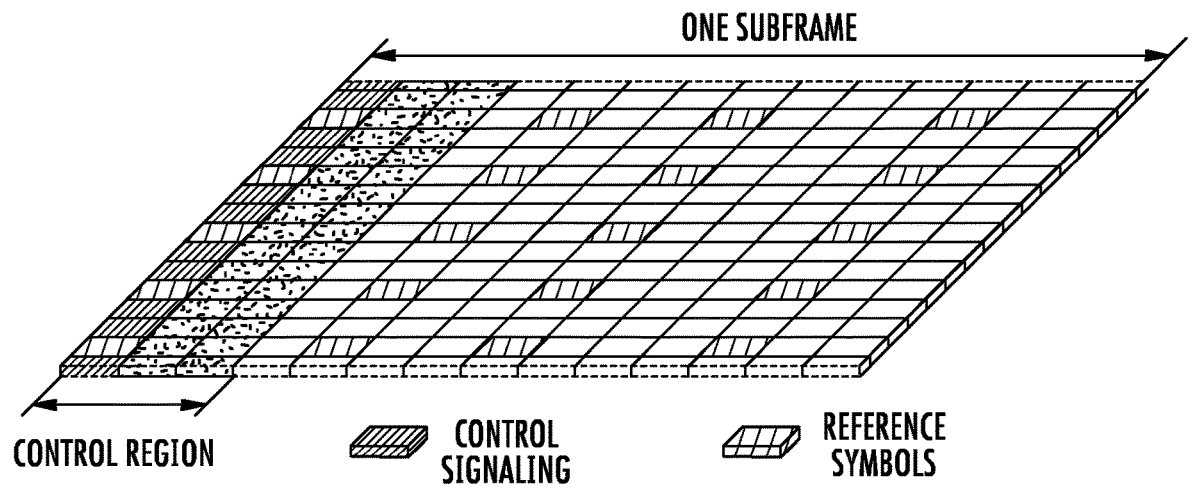
FIG. 4 is a diagram of 3 OFDM symbols.
Figure 5:
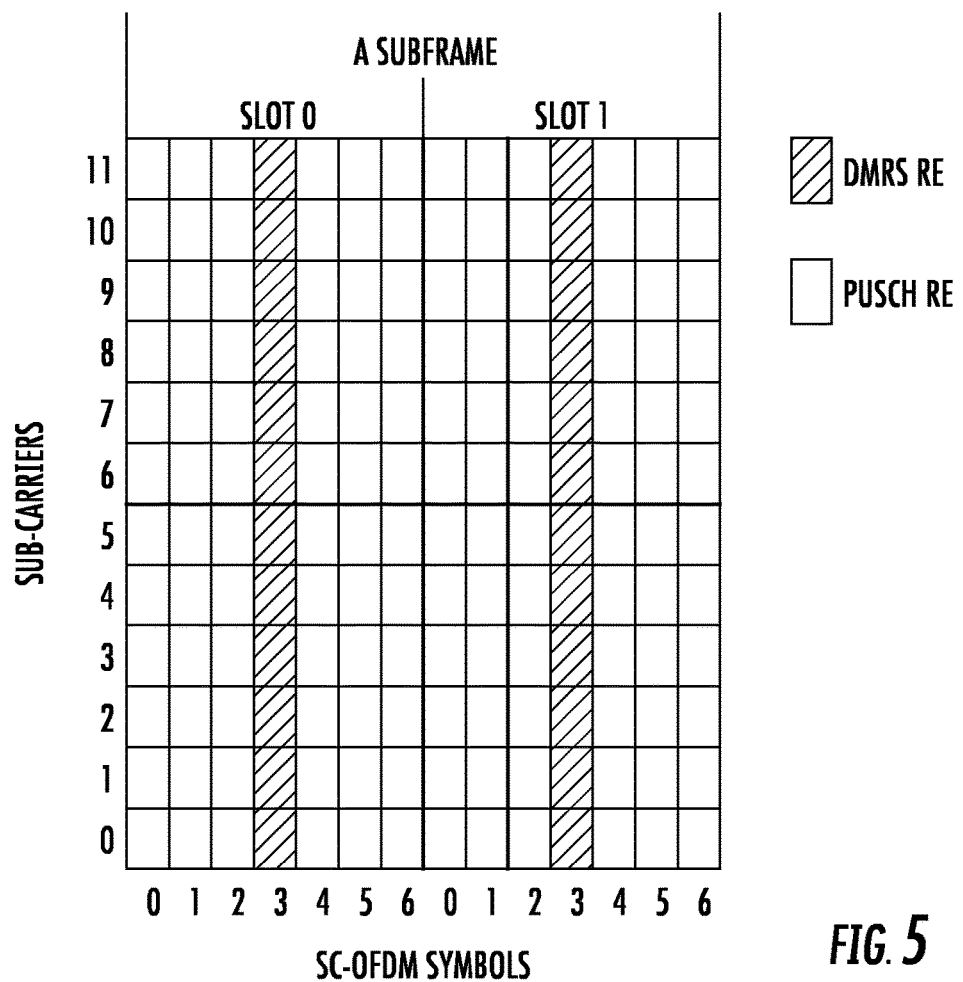
FIG. 5 is a diagram of SC-OFDM symbol resource elements.
Figure 6:
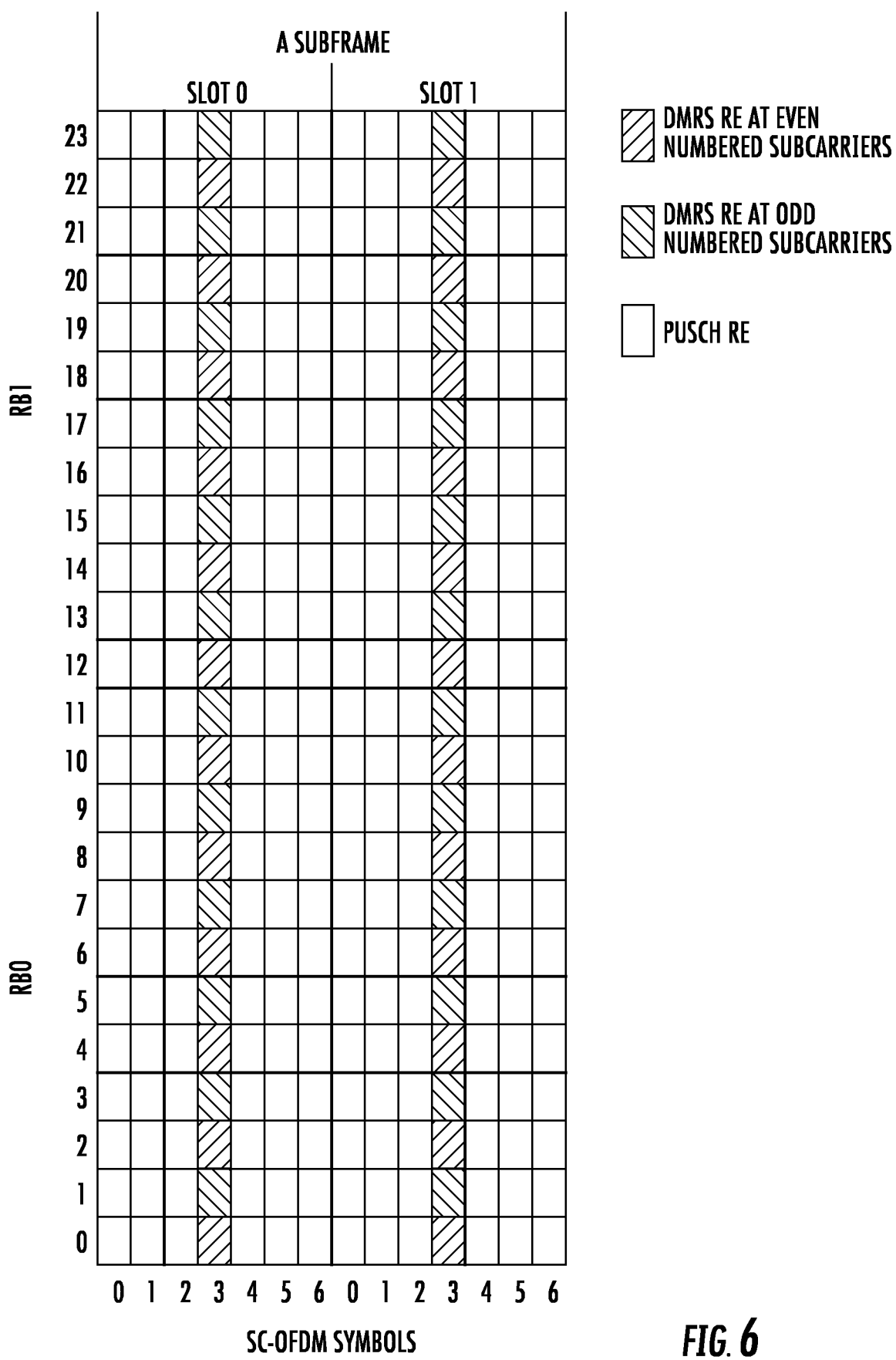
FIG. 6 is a diagram of SC-OFDM symbols.
Figure 7:
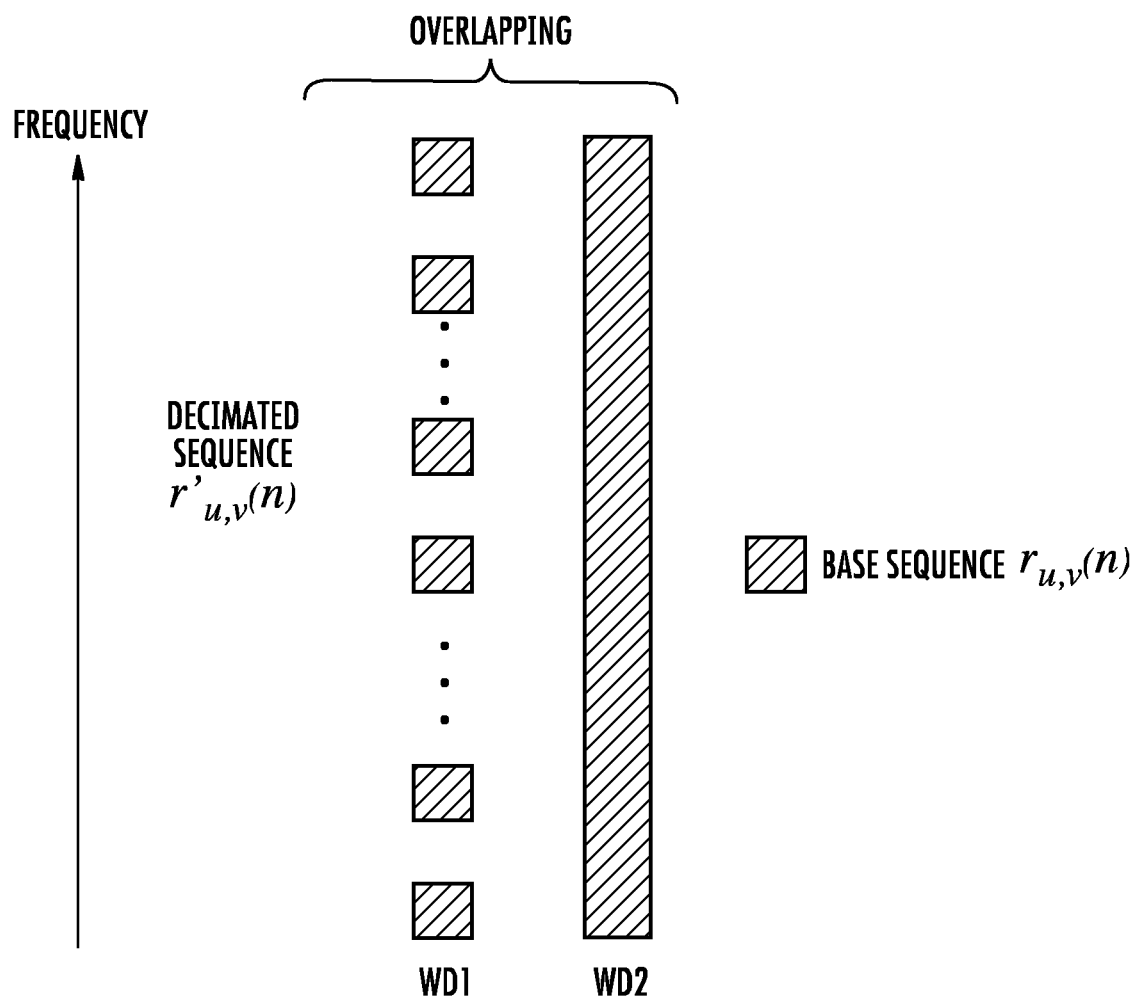
FIG. 7 is a diagram DMRS sequences.
Figure 8:
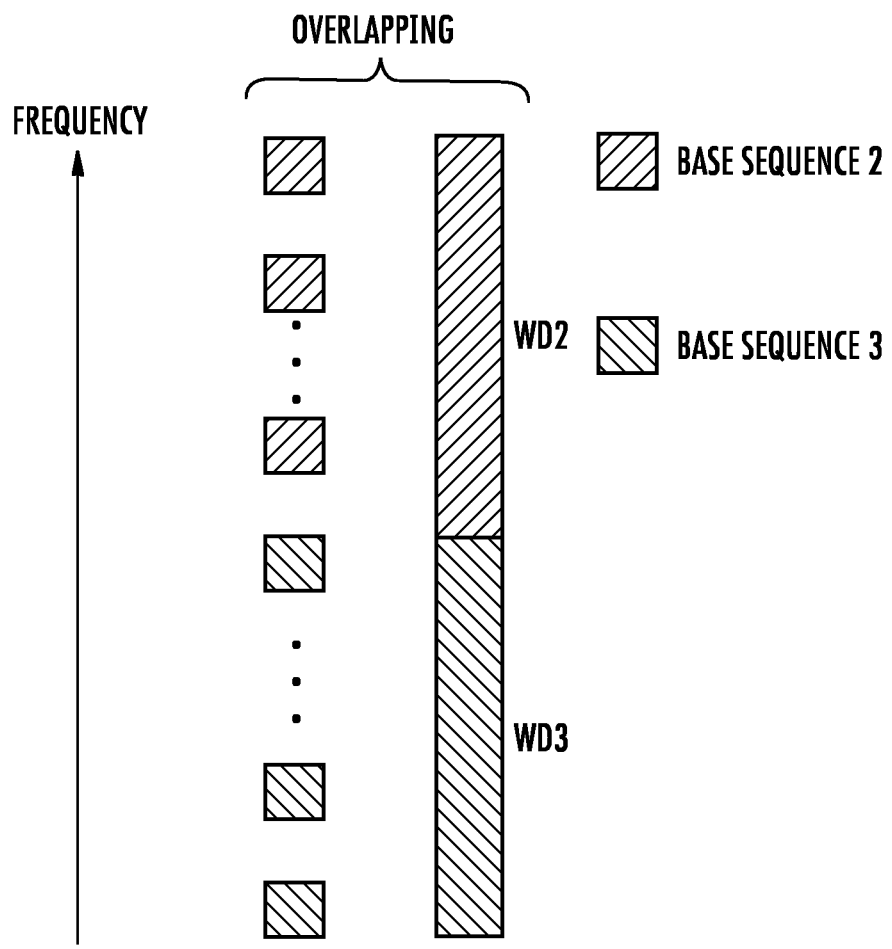
FIG. 8 is a diagram of DMRS sequences.
Figure 13:
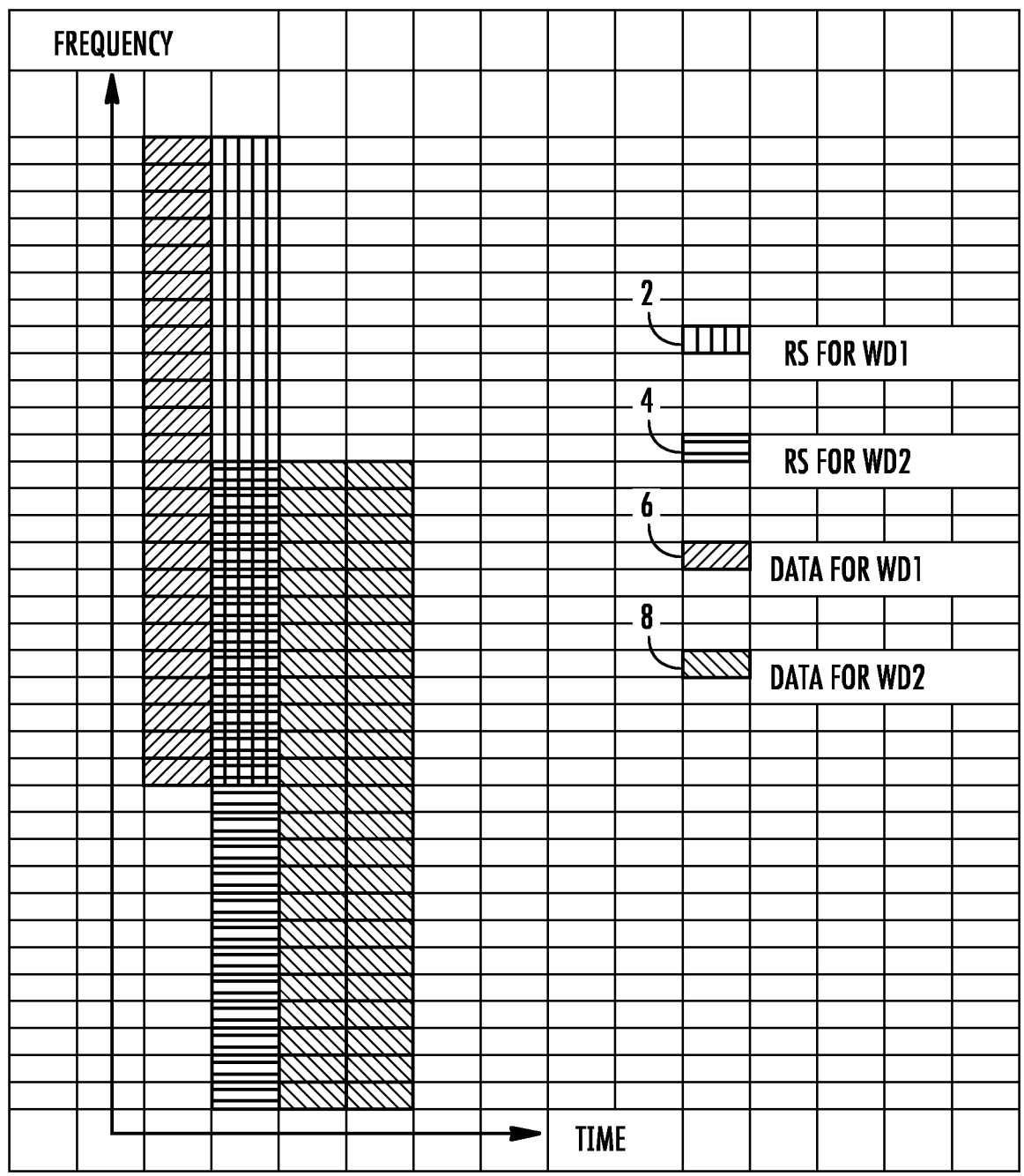
FIG. 13 is a diagram of allocation of frequency resources among WDs.

Before describing in detail exemplary embodiments, it is noted that the embodiments reside primarily in combinations of apparatus components and processing steps related to signaling of DMRS configurations for uplink short transmission time interval (sTTI) transmissions. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Note that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Embodiments provide methods of signaling DMRS configurations of uplink short TTI transmissions. In particular, the signaling methods support multiplexing of DMRS of different wireless devices for uplink short TTI transmissions. In some embodiments, a network node configures a wireless device for multiplexing DMRS by generating an indication of interleaved frequency division multiple access (IFDMA) subcarrier configuration and by transmitting the indication of the IFDMA subcarrier configuration to the wireless device. The IFDMA subcarrier configuration indication may include which subcarriers are to be used for DMRS transmission and may further indicate whether or not IFDMA is to be used by the wireless device.

An LTE subframe lasting 1 ms contains 14 OFDM symbols for normal CP. A New Radio (5G), NR, subframe may have a fixed duration of 1 ms and may therefore contain a different number of OFDM symbols for different subcarrier spacings. An LTE slot corresponds to 7 OFDM symbols for normal CP. An NR slot corresponds to 7 or 14 OFDM symbols; at 15 kHz subcarrier spacing, a slot with 7 OFDM symbols occupies 0.5 ms. Concerning NR terminology, reference is made to 3GPP TR 38.802 v14.0.0 and later versions.

Aspects of this disclosure may be applicable to either LTE or NR radio communications. References to a short TTI may alternatively be considered as a mini-slot, according to NR terminology. The mini-slot may have a length of 1 symbol, 2 symbols, 3 or more symbols, or a length of between 1 symbol and a NR slot length minus 1 symbol. The short TTI may have a length of 1 symbol, 2 symbols, 3 or more symbols, an LTE slot length (7 symbols) or a length of between 1 symbol and a LTE subframe length minus 1 symbol. The short TTI, or mini-slot, may be considered as having a length less than 1ms or less than 0.5 ms.

Figure 14:
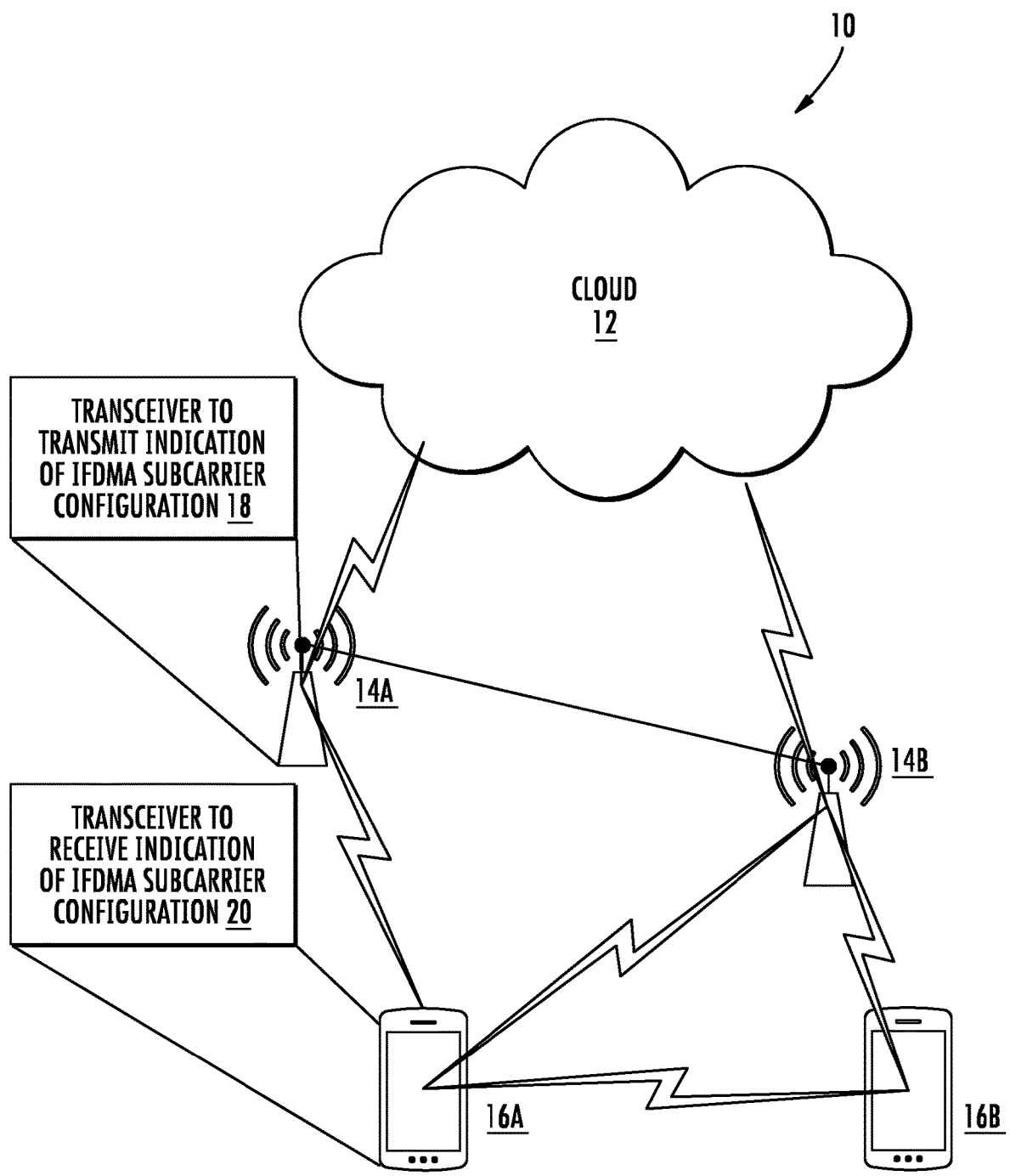
FIG. 14 is a block diagram of a wireless communication network constructed in accordance with principles set forth herein.

Returning to the drawing figures, in which like elements are referred to by like reference numerals, there is shown in FIG. 14 a block diagram of a wireless communication system 10 constructed according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes 14A and 14B, which may communicate directly via an X2 interface in LTE embodiments, and are referred to collectively as network nodes 14. It is contemplated that other interface types can be used for communication between network nodes 14 for other communication protocols such as New Radio (NR). The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14. Further, in some embodiments, WDs 16 may communicate directly using what is sometimes referred to as a side link connection.

The term "wireless device" or mobile terminal used herein may refer to any type of wireless device communicating with a network node 14 and/or with another wireless device 16 in a cellular or mobile communication system 10. Examples of a wireless device 16 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term "network node" used herein may refer to any kind of radio base station in a radio network which may further comprise any base transceiver station (BTS), base station controller (BSC), radio network controller (RNC), evolved Node B (eNB or eNodeB), NR gNodeB, NR gNB, Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Although embodiments are described herein with reference to certain functions being performed by network node 14, it is understood that the functions can be performed in other network nodes and elements. It is also understood that the functions of the network node 14 can be distributed across network cloud 12 so that other nodes can perform one or more functions or even parts of functions described herein.

As shown in FIG. 14, the network node 14 includes a transceiver 18 configured to transmit an indication of an interleaved frequency division multiple access subcarrier configuration for DMRS transmission. Complementarily, the wireless device 16 includes a transceiver to receive the indication of an interleaved frequency division multiple access subcarrier configuration for DMRS transmission.

Figure 15:
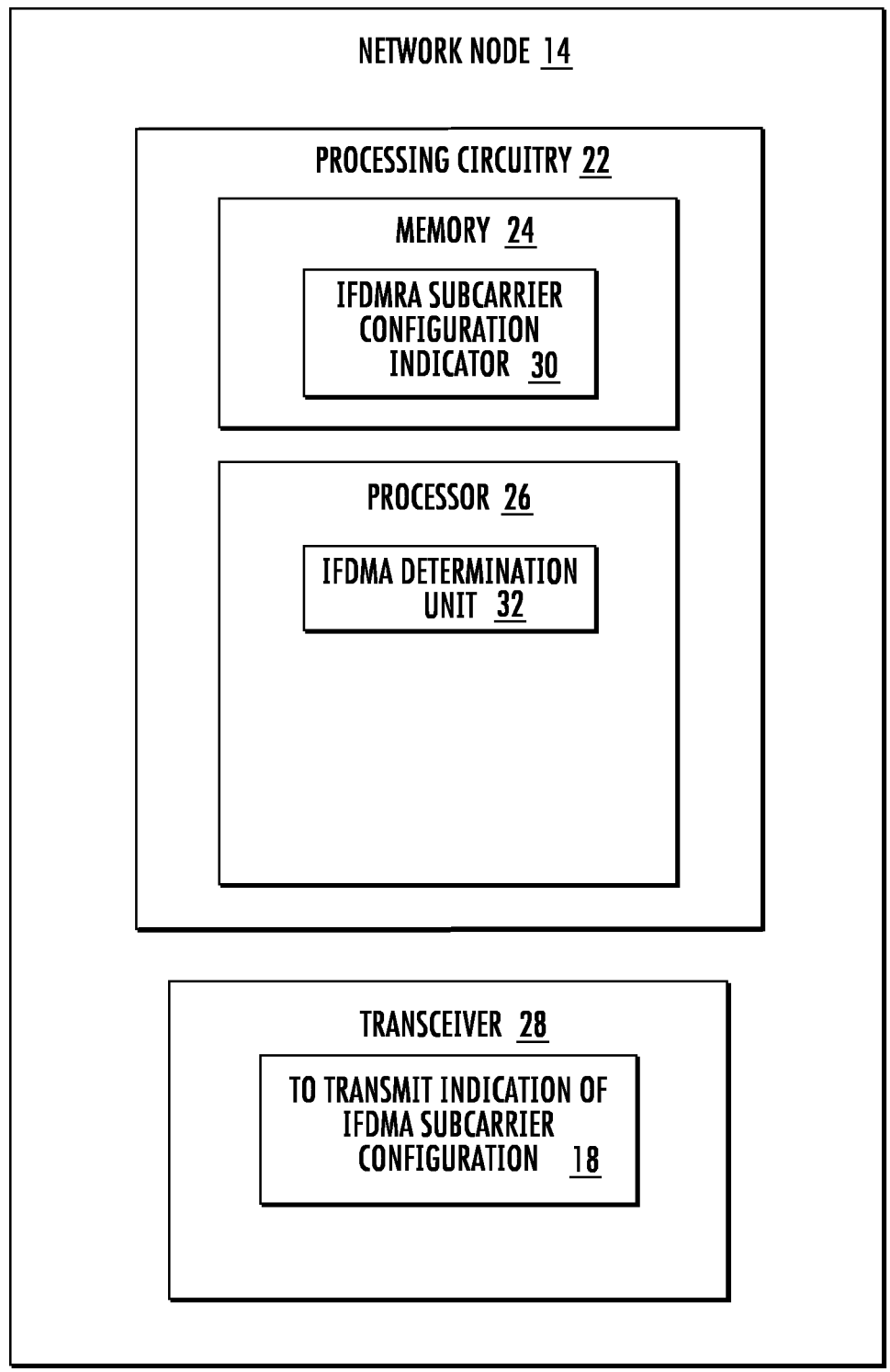
FIG. 15 is a block diagram of a network node constructed in accordance with principles set forth herein.

FIG. 15 is a block diagram of a network node 14 for signaling demodulation reference symbol, DMRS, configurations of uplink short transmission time interval, sTTI, transmissions, the signaling supporting multiplexing of DMRS of different wireless devices for uplink sTTIs. In some examples, the DMRS symbols may be shared/multiplexed between different wireless devices, each using one or more sTTIs, as shown in FIGS. 6 and 9 to 11. Any of the arrangements or features described herein, including those in the background section, may be combined with the arrangements or features described in any example of the disclosure. For example, the wireless device 16 or network node 14 according to any example may be operating in a multiple input multiple output (MIMO) mode or a multi-user (MU)-MIMO mode.

The network node 14 has processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store an IFDMA subcarrier configuration indicator 30 which may be transmitted to a wireless device 16. The processor 26 includes an IFDMA determination unit 32 configured to generate an indication of an interleaved frequency division multiple access, IFDMA, subcarrier configuration for DMRS transmission. The transceiver 28 is configured to transmit to the wireless device 16 the indication of IFDMA subcarrier configuration.

Figure 16:
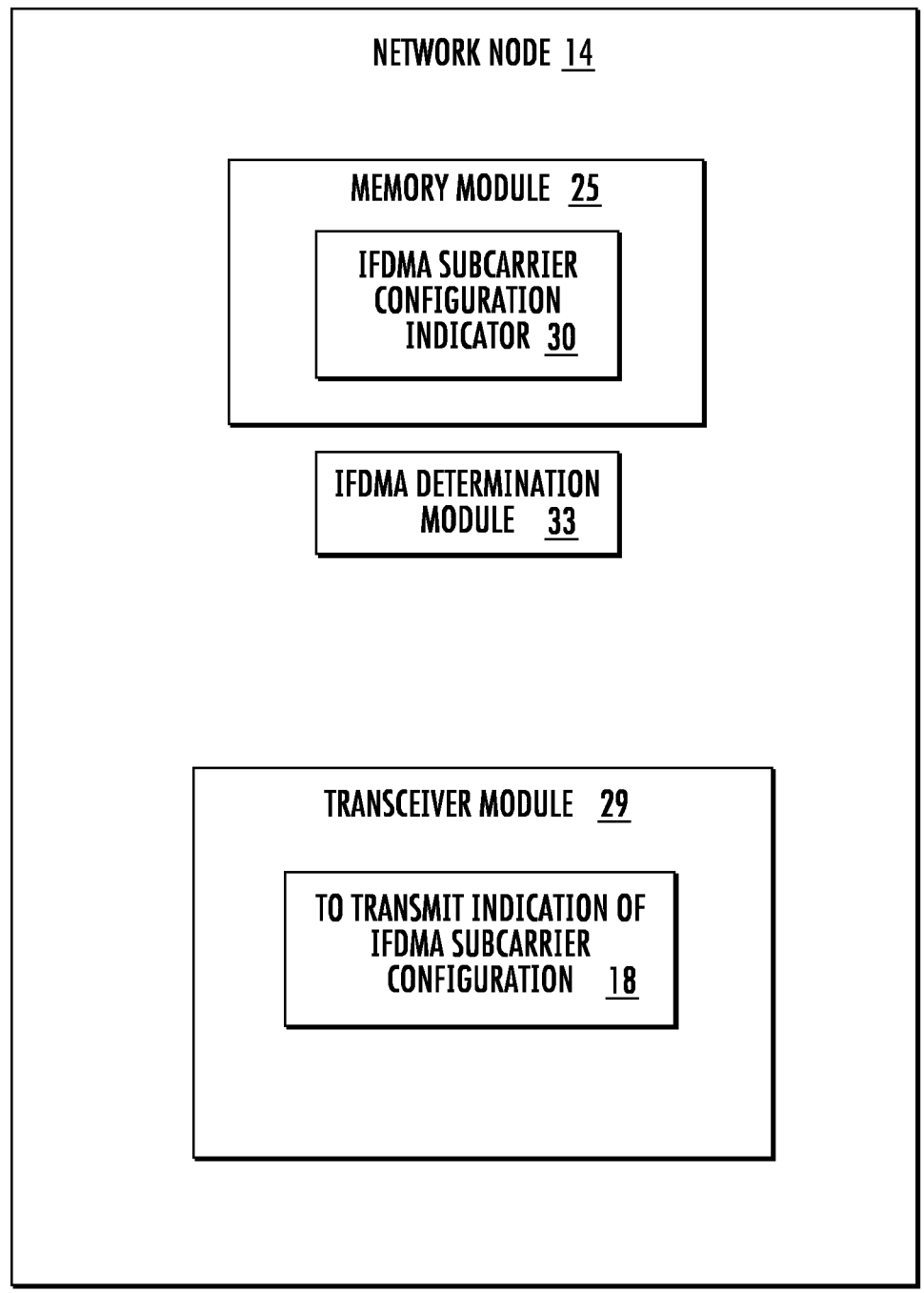
FIG. 16 is a block diagram of an alternative embodiment of a network node.

FIG. 16 is a block diagram of an alternative embodiment of a network node 14 for configuring a wireless device for multiplexing demodulation reference signals, DMRS, during short transmission time intervals, sTTIs. The network node 14 may be implemented at least in part by software executable by a processor to perform functions described herein. An IFDMA determination module 33 generates an indication of an interleaved frequency division multiple access, IFDMA, subcarrier configuration for DMRS transmission. The transceiver module 29 transmits to the wireless device the indication of IFDMA subcarrier configuration.

Figure 17:
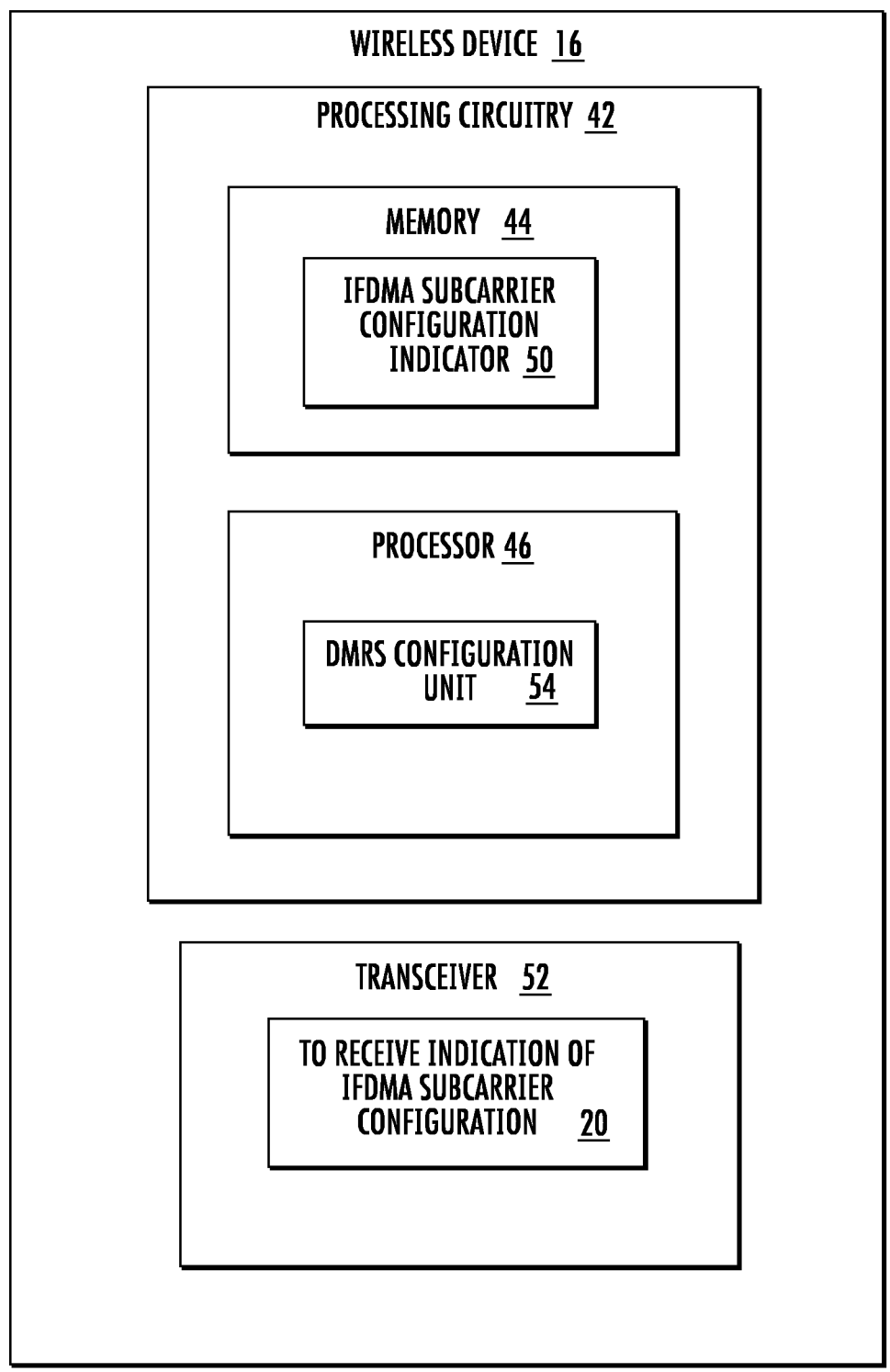
FIG. 17 is a block diagram of a wireless device constructed in accordance with principles set forth herein.

FIG. 17 is a block diagram of a wireless device 16. The wireless device 16 has processing circuitry 42. In some embodiments, the processing circuitry may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 64 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store an IFDMA subcarrier configuration indicator 50. The processor 46 implements a DMRS configuration unit 54 that is configured to configure DMRS transmissions according to the IFDMA subcarrier configuration indicator 50. The transceiver 52 is configured to receive from the network node 14 the indication of IFDMA subcarrier configuration.

Figure 18:
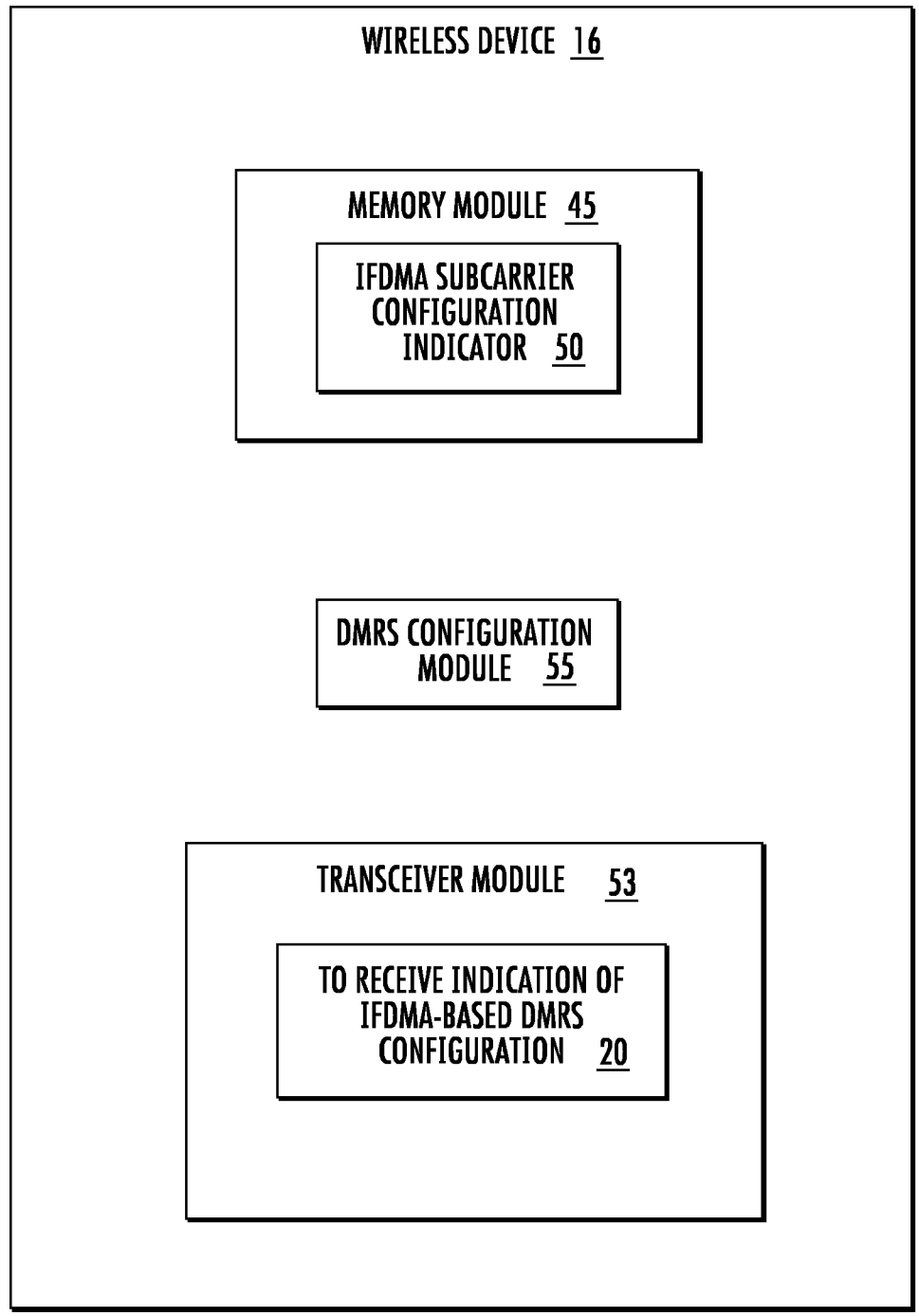
FIG. 18 is a block diagram of an alternative embodiment of a wireless device.

FIG. 18 is a block diagram of an alternative embodiment of a wireless device 16 for configuring DMRS transmissions according to an IFDMA subcarrier configuration indicator received from a network node. The wireless device 16 may be implemented at least in part by software executable by a processor to perform functions described herein. The DMRS configuration module 55 is configured to configure DMRS transmissions according to the IFDMA subcarrier configuration indicator 50. The transceiver module 53 is configured to receive from the network node 14 the indication of IFDMA subcarrier configuration.

Figure 19:
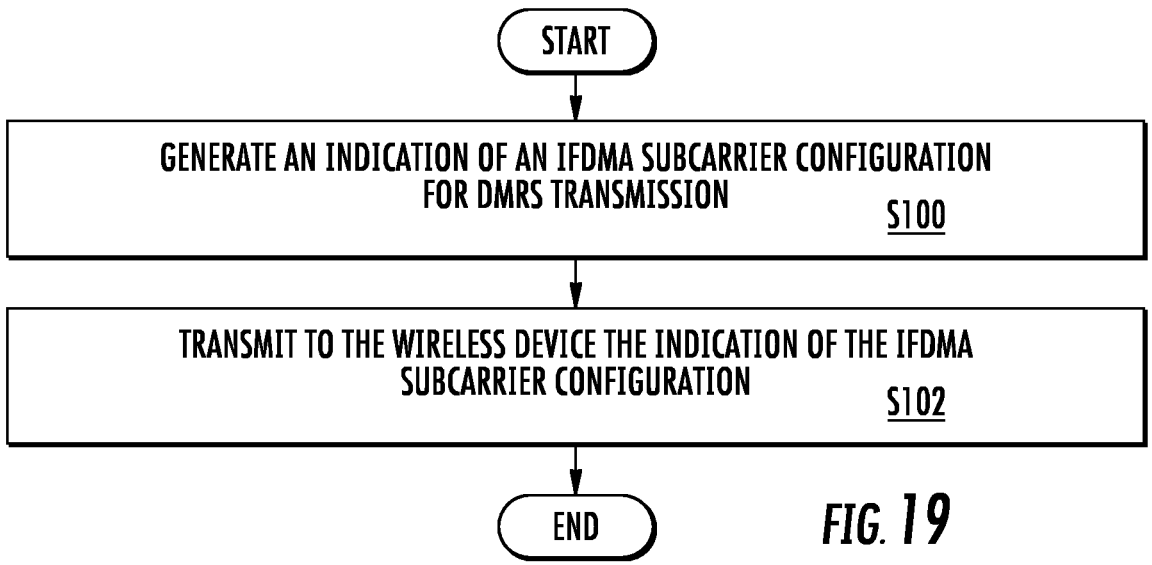
FIG. 19 is a flowchart of an exemplary process performed at a wireless device.

FIG. 19 is a flowchart of an exemplary process in a network node 14 for configuring a wireless device for multiplexing demodulation reference signals, DMRS, during short transmission time intervals (sTTIs). The process includes generating an indication of an interleaved frequency division multiple access (IFDMA) subcarrier configuration for DMRS transmission (block S 100). The process further includes transmitting to the wireless device the indication of IFDMA subcarrier configuration (block S 102). Alternatively, in some embodiments, a method may constitute the sole step of transmitting to the wireless device 16 an indication of an interleaved frequency division multiple access, IFDMA, subcarrier configuration for DMRS transmission. In some examples, a method in a network node may include receiving a DMRS from one or more wireless devices 16, in which the DMRS have an interleaved frequency division multiple access, IFDMA, subcarrier configuration.

Figure 20:
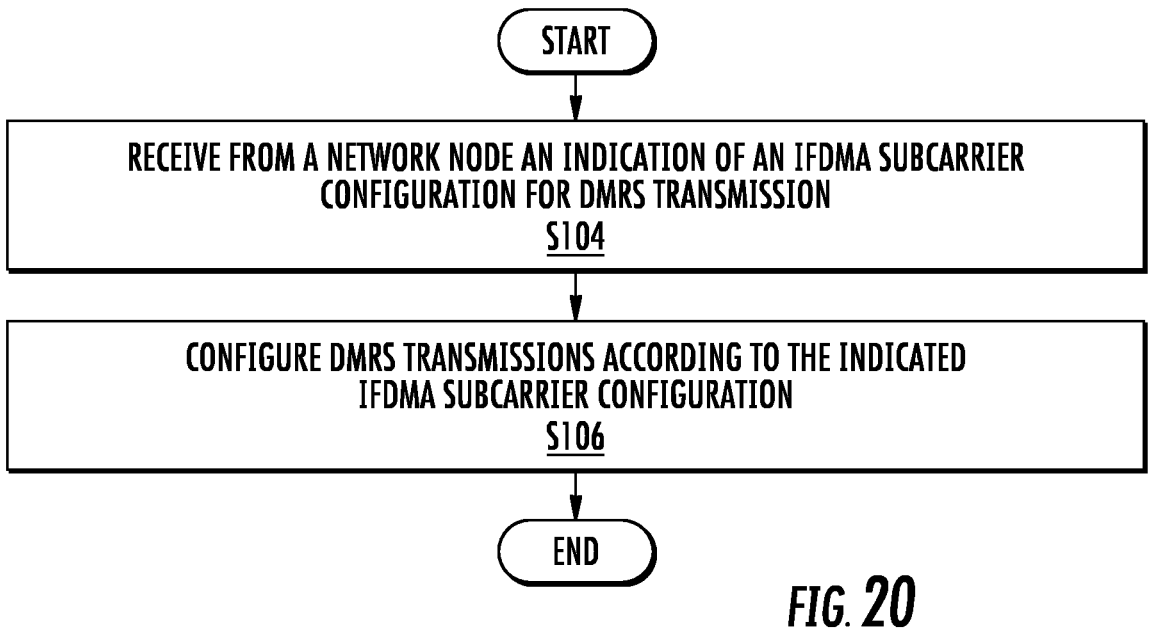
FIG. 20 is a flowchart of an exemplary process for DMRS signaling.

FIG. 20 is a flowchart of an exemplary process in a wireless device 16 for configuring demodulation reference signals, DMRS, during short transmission time intervals (sTTIs). The process includes receiving from a network node an indication of an interleaved frequency division multiple access, IFDMA, subcarrier configuration for DMRS transmission (block S 104). The process also includes configuring DMRS transmissions according to the indication (block S 106). In some examples, the method may further comprise the wireless device 16 transmitting a DMRS according to an interleaved frequency division multiple access, IFDMA, subcarrier configuration. Alternatively, in some embodiments, the method may constitute the sole step of receiving at the wireless device 16 an indication of an interleaved frequency division multiple access, IFDMA, subcarrier configuration for DMRS transmission. Alternatively, in some embodiments, the method, may constitute the sole step of the wireless device 16 transmitting a DMRS according to an interleaved frequency division multiple access, IFDMA, subcarrier configuration.

In case only an IFDMA-based method is used for DMRS multiplexing for uplink short TTI transmissions, signaling options are proposed:

Option 1: The subcarrier configuration for DMRS transmission is signaled by radio resource control (RRC). The cyclic shift is signaled by the legacy 3-bit cyclic shift field in UL DCI and the legacy cyclic shift mapping table is reused for sPUSCH transmissions.

Option 2: The subcarrier configuration for DMRS transmission is signaled by one bit in UL DCI. The cyclic shift is signaled by the legacy 3-bit cyclic shift field in UL DCI and the legacy cyclic shift mapping table is reused for sPUSCH transmissions.

Option 3: The cyclic shift is signaled by the legacy 3-bit cyclic shift field in UL DCI and the subcarrier configuration is implicitly indicated by the cyclic shift index.

In case both cyclic-shift-based DMRS multiplexing (RPF=1) and IFDMA-based DMRS multiplexing (RPF>=2) method are used for multi-UE sPUSCH transmissions, three signaling options are proposed:

Option 1: RRC signaling to indicate whether the DMRS configuration is an IFDMA-based or no-IFDMA based DMRS configuration, and the subcarrier configurations for DMRS transmission. The legacy cyclic shift mapping table is reused. The cyclic shift parameter is indicated by the legacy 3-bit cyclic shift field in UL DCI.

Option 2: Introduce a new field with a single bit in UL DCI to indicate whether the DMRS configuration is a IFDMA-based DMRS configuration or not. The legacy cyclic shift mapping table is reused. The cyclic shift parameter and the subcarrier configuration are indicated by the legacy 3-bit cyclic shift field in UL DCI.

Option 3: Use the legacy 3-bit cyclic shift field to indicate the DMRS sequence configuration, including both the selected DMRS multiplexing method (including the subcarrier configuration) and the cyclic shift parameter, by adapting the legacy cyclic shift mapping table for sPUSCH transmissions.

With the proposed solutions, it is possible to multiplex the DMRS of different wireless devices on the same SC-FDMA symbol for uplink short TTI transmissions, in order to reduce the DMRS overhead. In particular, DMRS multiplexing can be supported for uplink short TTI transmissions from multiple wireless devices, whose allocated frequency bandwidth are fully overlapped or partially overlapped.

Methods of signaling DMRS configurations of uplink short TTI transmissions are presented. In particular, the signaling methods support multiplexing of DMRS of different wireless devices for uplink short TTI transmissions. As explained above, in one embodiment a short TTI is one less than 1 milli-second and a short PUSCH is an uplink shared channel with sTTIs.

In an embodiment, only the IFDMA-based DMRS multiplexing method is used for uplink short TTI transmissions. The subcarrier configuration for DMRS transmission is signaled by RRC. The cyclic shift is signaled by the legacy 3-bit cyclic shift field in UL DCI and the legacy cyclic shift mapping table is reused for sPUSCH transmissions.

In an embodiment, only the IFDMA-based DMRS multiplexing method is used for uplink short TTI transmissions. The subcarrier configuration for DMRS transmission is signaled by one bit in UL DCI.

In another embodiment, only the IFDMA-based DMRS multiplexing method is used for uplink short TTI transmissions. The cyclic shift is signaled by the legacy 3-bit cyclic shift field in UL DCI and the subcarrier configuration is implicitly indicated by the cyclic shift index.

In an embodiment, both cyclic-shift-based DMRS multiplexing (RPF=1) and IFDMA-based DMRS multiplexing method (RPF=2) are used for uplink short TTI transmissions. The DMRS configuration for each wireless device is signaled from the eNB based on one of the three options below.

Option 1: RRC signaling to indicate whether the DMRS configuration is a IFDMA-based or no-IFDMA based DMRS configuration, and the subcarrier configurations for DMRS transmission. The legacy cyclic shift mapping table is reused. The cyclic shift parameter is indicated by the legacy 3-bit cyclic shift field in UL DCI.

Option 2: Introduce a new field with a single bit in UL DCI to indicate whether the DMRS configuration is a IFDMA-based DMRS configuration. The legacy cyclic shift mapping table is reused. The cyclic shift parameter is indicated by the legacy 3-bit cyclic shift filed in UL DCI.

Option 3: Use the legacy 3-bit cyclic shift field to indicate the DMRS sequence configuration, including both the selected DMRS multiplexing method and the cyclic shift parameter, by adapting the legacy cyclic shift mapping table for sPUSCH transmissions.

In an embodiment, the RRC signaling explicitly indicates the subcarrier configuration for IFDMA-based DMRS transmission of the wireless device. In another embodiment, the subcarrier configuration for IFDMA-based DMRS transmission is signaled by a bit-field in UL DCI. In another embodiment, the subcarrier configuration for IFDMA-based DMRS transmission is implicitly indicated by a predefined mapping between subcarrier configurations and cyclic shift indices.

Some examples of how to multiplex DMRS from different wireless devices 16 for sPUSCH transmissions, considering different frequency allocation cases, are given. The examples of signaling of the DMRS multiplexing are also given.

Figure 21:
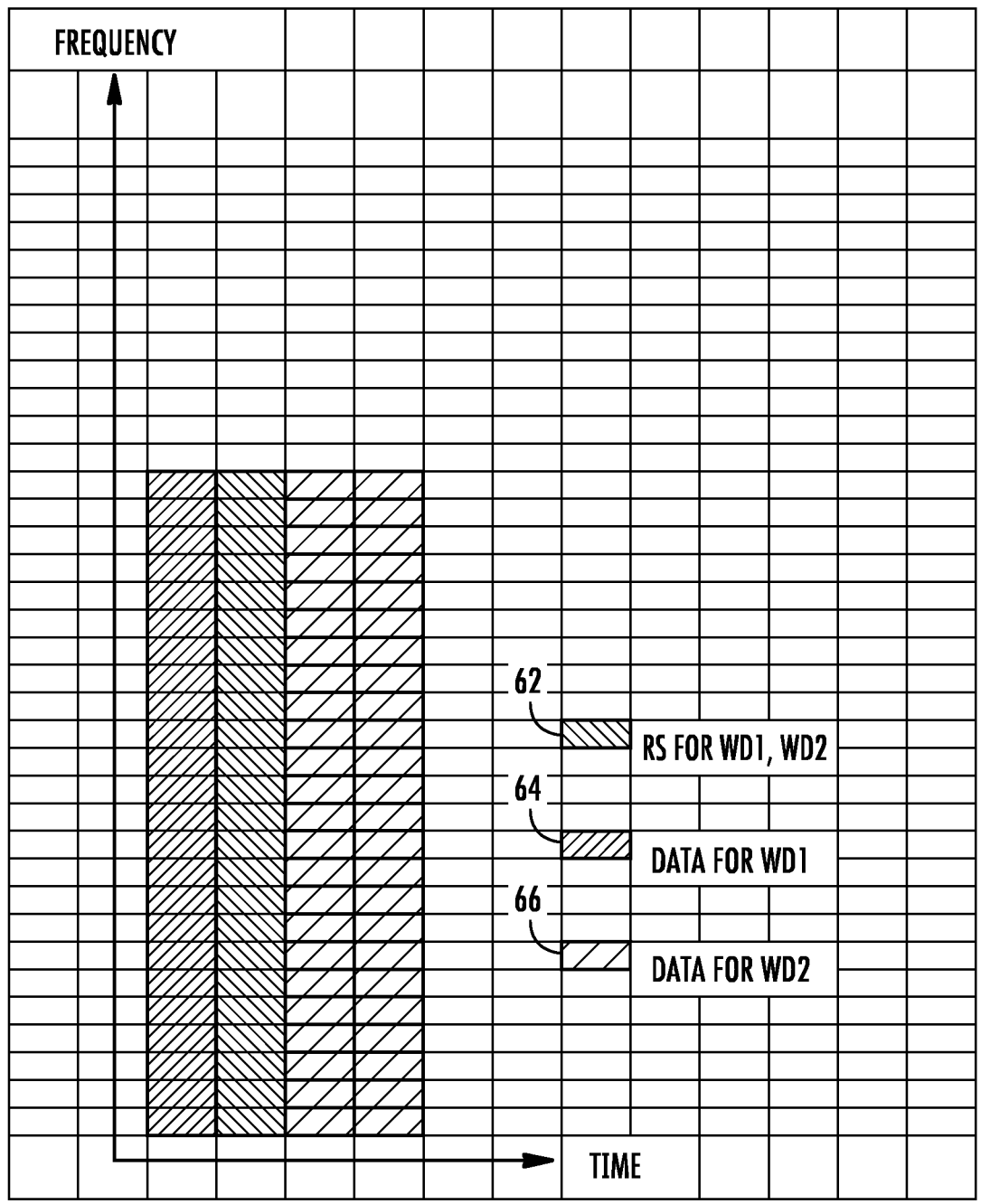
FIG. 21 is a diagram of allocation of frequency resources among WDs.

FIG. 21 illustrates the case where the multiplexed wireless devices 16 are allocated with the same uplink frequency bandwidth. In this case, three different DMRS multiplexing approaches can be used. The legends 62, 64 and 66 are RS and data for WD1, e.g., WD 16a (FIG. 14) and WD2, e.g., WD 16b (FIG. 14) as indicated.

Approach 1: DMRS from different wireless devices are multiplexed on the same SC-FDMA symbol with RPF=1 by using different cyclic shifts.

Figure 22:
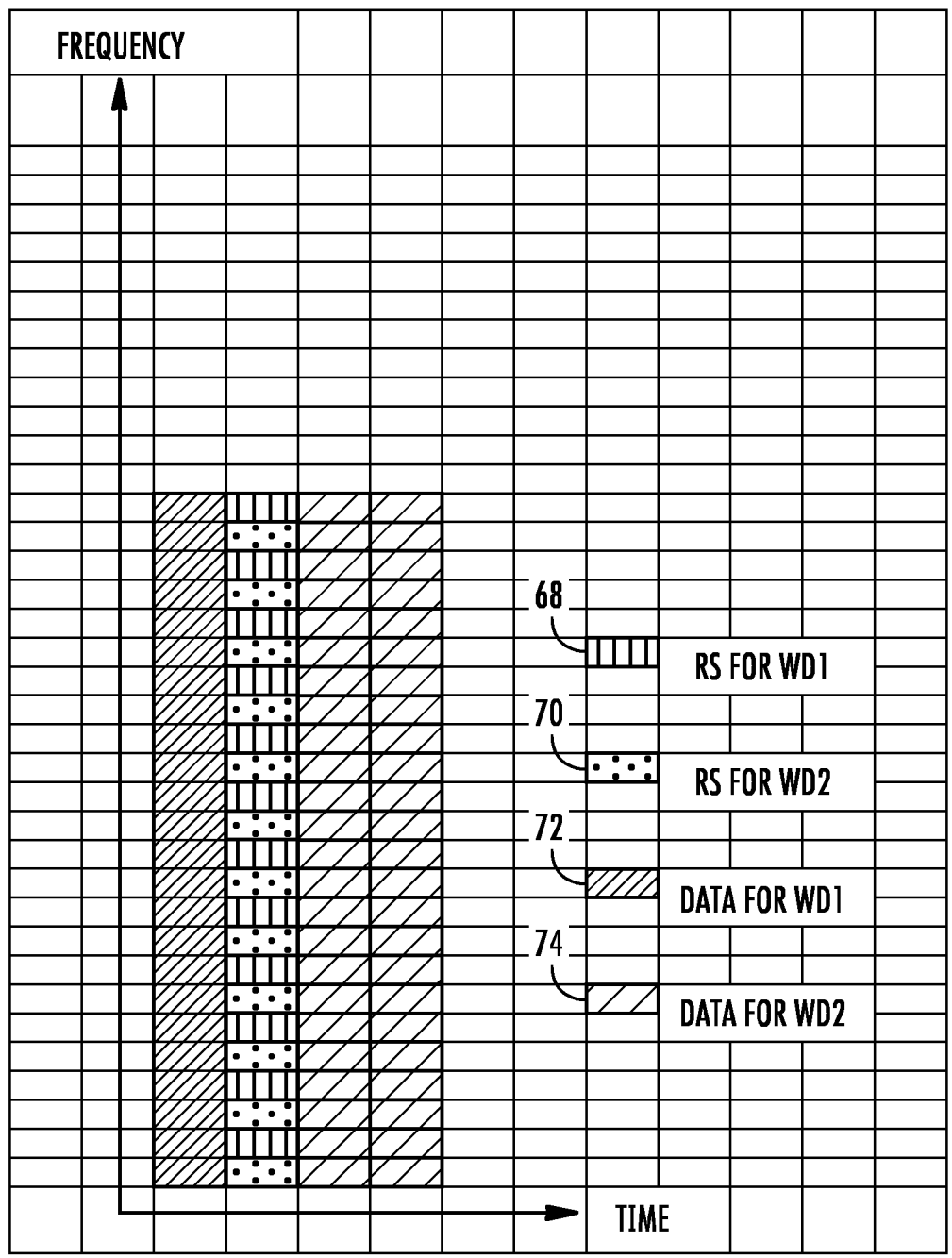
FIG. 22 is a diagram of allocation of frequency resources among WDs.

Approach 2: DMRS from different wireless devices are multiplexed on the same SC-FDMA symbol but different subcarriers with RPF=2, as shown in FIG. 22, where the legends 68, 70, 72 and 74 are RS and data for WD1, e.g., WD 16a (FIG. 14) and WD2, e.g., WD 16b (FIG. 14) as indicated.

Figure 23:
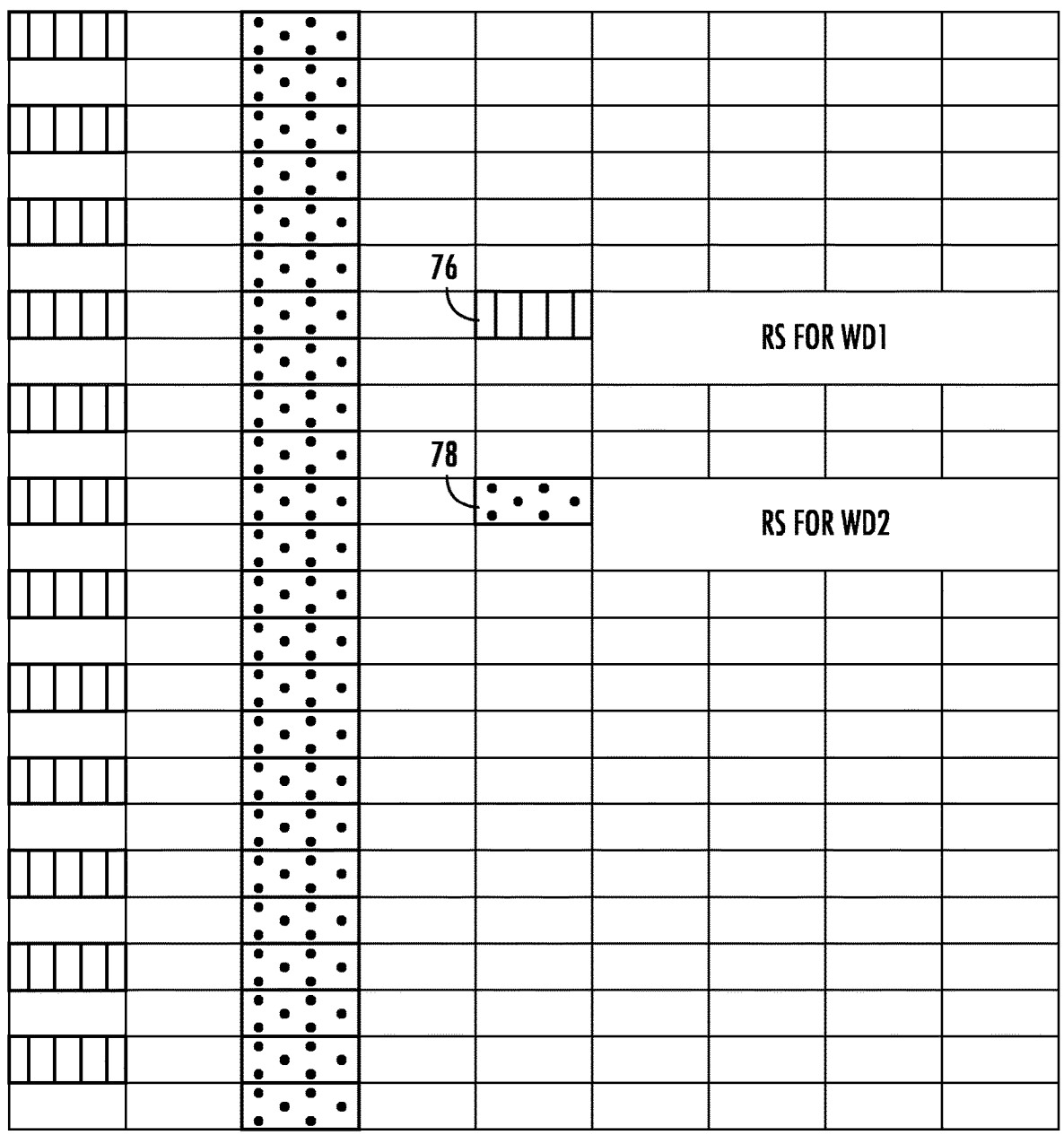
FIG. 23 is a diagram of allocation of frequency resources among WDs.

Approach 3: As shown in FIG. 23, the DMRS of one wireless device (WD2) is configured with RPF=1, where the legend 78 indicates RS for WD2, e.g., WD 16b (FIG. 14) as indicated. The DMRS of the other wireless device is configured with RPF=2, as shown in FIG. 23, where the legend 76 indicates RS for WD1, e.g., WD 16a (FIG. 14) as indicated.

When different wireless devices are allocated with partially overlapped frequency bandwidth, approaches 2 and 3 can be used.

Figure 24:
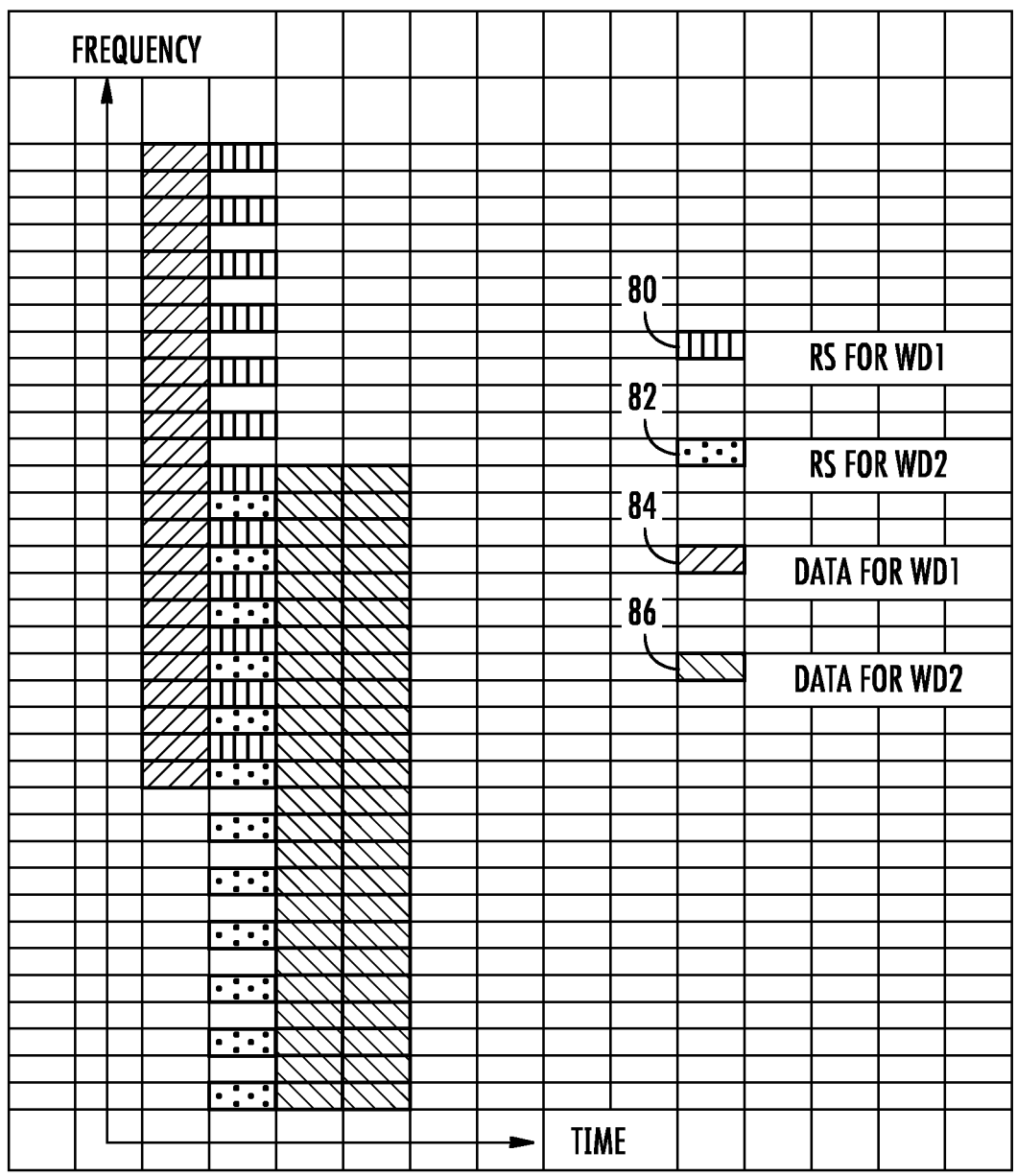
FIG. 24 is a diagram of allocation of frequency resources among WDs.
Figure 25:
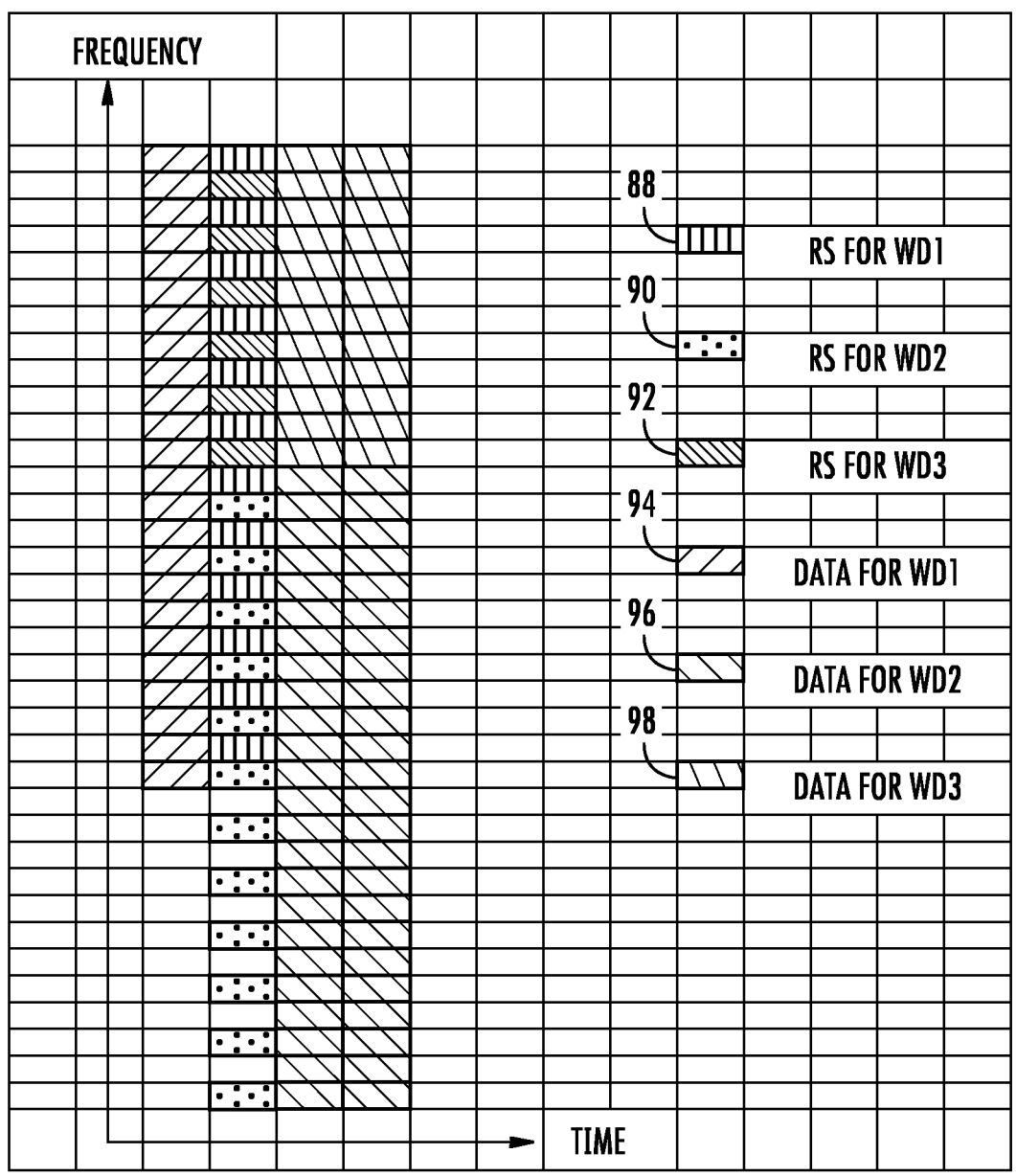
FIG. 25 is a diagram of allocation of frequency resources among WDs.
Figure 26:
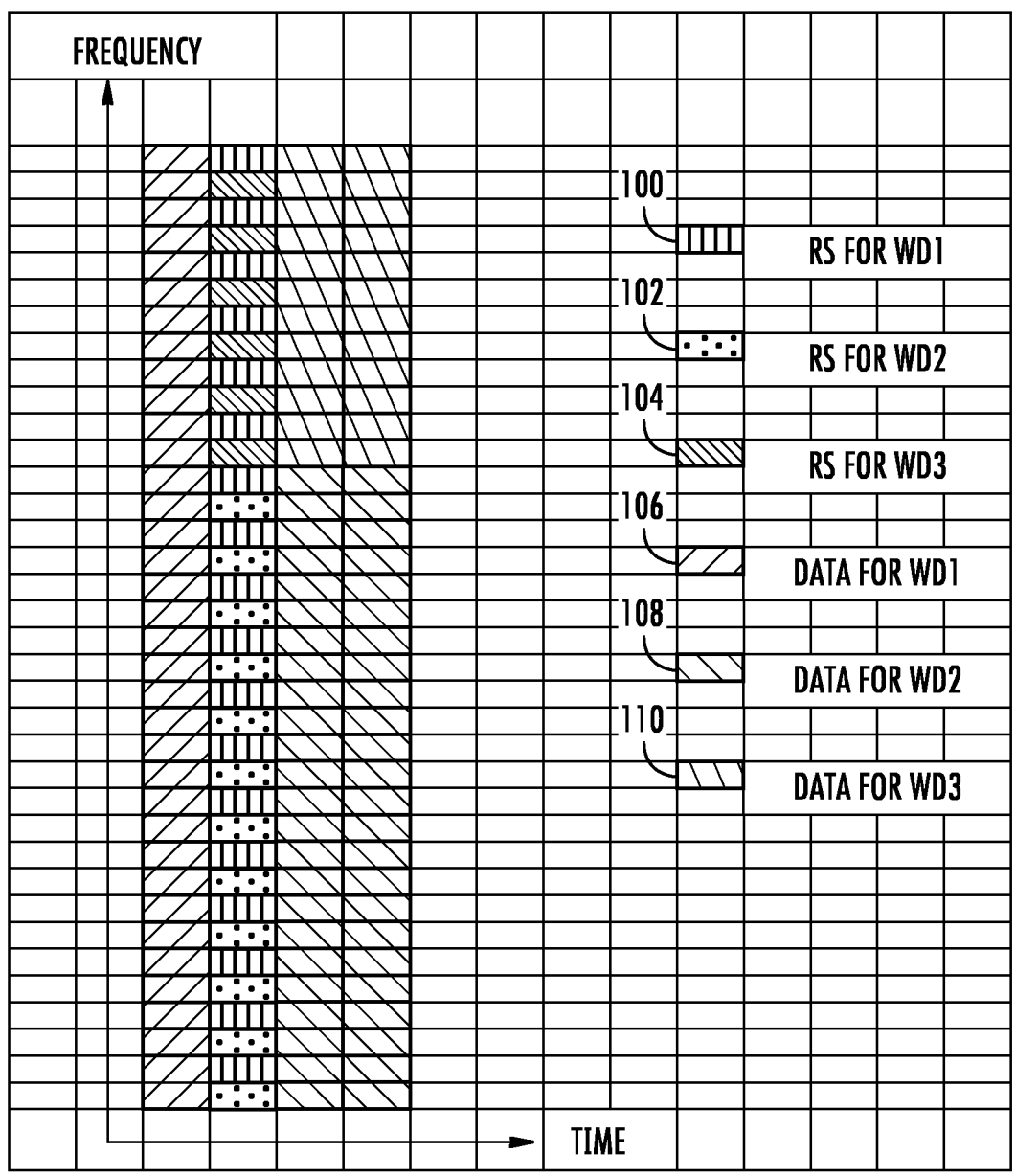
FIG. 26 is a diagram of allocation of frequency resources among WDs.

FIGS. 24, 25 and 26 illustrate examples of IFDMA-based DMRS multiplexing of different wireless devices, where the sPUSCH transmissions are allocated with partially overlapped frequency bandwidth, where the legends 80-110 are RS and data for WD1, e.g., WD 16a (FIG. 14), WD2, e.g., WD 16b (FIG. 14) and WD3, e.g., another WD 16 as indicated.

Signaling for only IFDMA-based DMRS multiplexing for sPUSCH

In one example, only the IFDMA-based DMRS multiplexing method (RPF>=2) is used for uplink short TTI transmissions.

Solution 1: The RRC signaling explicitly indicates the subcarriers used for DMRS transmission of the wireless device, e.g., the odd or the even subcarriers within the allocated frequency bandwidth if RPF=2. The cyclic shift is signaled by the legacy 3-bit cyclic shift field in UL DCI and the legacy cyclic shift mapping table is reused.

Solution 2: Introduce a one-bit field in UL DCI to explicitly indicate the subcarriers used for DMRS transmission of the wireless device, e.g., the odd or the even subcarriers within the allocated frequency bandwidth if RPF=2. The cyclic shift is signaled by the legacy 3-bit cyclic shift field in UL DCI and the legacy cyclic shift mapping table is reused.

Solution 3: Implicitly indicate the subcarrier allocation for DMRS by predefining a mapping rule such that a subset of cyclic shifts indicates IFDMA RPF-2 in odd subcarriers, and the compliment subset of cyclic shifts indicates IFDMA RPF-2 in even subcarriers. In this case, RRC signaling is not needed.

Table 5 gives an example of the mapping between cyclic shifts and IFDMA subcarrier configurations. The mapping is designed to guarantee the best possible cyclic shift separation in scenarios with high Doppler spread and low delay spread. The cyclic shifts with the highest minimum separation for the first layer are chosen in this example. From the legacy cyclic shift field mapping in Table 3, the cyclic shifts possible for the 1st layer (i.e., A=0) are {0, 2, 3, 4, 6, 8, 9, 10}. The subset {0, 3, 6, 9} provides the best possible minimum cyclic shift difference of 3 for the 1st layer. This corresponds to 000, 001, 010, and 111 in the cyclic shift field in Table 3 above, and thus these cyclic shifts are mapped to the same subcarrier configuration, e.g., the odd subcarriers, for IFDMA-based DMRS multiplexing with RPF=2.

TABLE 5

| Cyclic Shift Field in uplink-related DCI format | $n_{DMRS,\lambda}^{(2)}$ | | | | IFDMA Configuration |
|---|---|---|---|---|---|
| | $\lambda = 0$ | $\lambda = 1$ | $\lambda = 2$ | $\lambda = 3$ | |
| 000 | 0 | 6 | 3 | 9 | Odd subcarriers |
| 001 | 6 | 0 | 9 | 3 | Odd subcarriers |
| 010 | 3 | 9 | 6 | 0 | Odd subcarriers |
| 011 | 4 | 10 | 7 | 1 | Even subcarriers |
| 100 | 2 | 8 | 5 | 11 | Even subcarriers |
| 101 | 8 | 2 | 11 | 5 | Even subcarriers |
| 110 | 10 | 4 | 1 | 7 | Even subcarriers |
| 111 | 9 | 3 | 0 | 6 | Odd subcarriers |

Consider the IFMDA-based DMRS-multiplexing case shown in FIG. 24, and assume that both wireless device 1 and wireless device 2 are configured with two-layer uplink sTTI transmission. Based on Table 5, one way of signaling the DMRS configuration for wireless device 1 and wireless device 2 is to set the cyclic shift field in UL UCI for wireless device 1 to 000, and set the cyclic shift filed for wireless device 2 to 101, to provide the best possible cyclic shift separation.

Signaling for both IFDMA-based and no-IFDMA based DMRS multiplexing for sPUSCH

In another example, both IFDMA-based (RPF>=2) and no-IFDMA based (RPF=1) DMRS multiplexing methods are supported for uplink short TTI transmissions.

Solution 1: The RRC signaling explicitly indicates the subcarrier configuration used for DMRS transmission of the wireless device, i.e., IFDMA RPF-2 in odd subcarriers, IFDMA RPF-2 in even subcarriers, no-IFDMA in all allocated subcarriers. The cyclic shift is signaled by the legacy 3-bit cyclic shift field in UL DCI and the legacy cyclic shift mapping table is reused.

Solution 2: Introduce a new field with 1 bit in UL DCI to indicate the subcarrier configuration for DMRS transmission of the wireless device. The cyclic shift is signaled by the legacy 3-bit cyclic shift field in UL DCI and the legacy cyclic shift mapping table is reused.

Solution 3: Implicitly indicate the subcarrier configuration, including the selected DMRS multiplexing scheme (IFDMA or no-IFDMA), for DMRS transmission by the cyclic shift signaled in 3-bit cyclic shift field in UL DCI. In this case, there is no extra signaling overhead.

Table 6 gives an example of the mapping between cyclic shifts and IFDMA/no-IFDMA configurations. The mapping is designed to guarantee the best possible cyclic shift separation in scenarios with high Doppler spread and low delay spread. The cyclic shifts with the highest minimum separation for the first layer are chosen in this example. From the legacy cyclic shift field mapping in Table 3, the cyclic shifts possible for the 1st layer are {0, 2, 3, 4, 6, 8, 9, 10}. The subset {0, 3, 6, 9} provides the best possible minimum cyclic shift difference of 3 for the 1st layer. This corresponds to 000, 001, 010, and 111 in the cyclic shift filed in Table 3, and thus these cyclic shifts are reserved for no-IFDMA based DMRS configuration.

TABLE 6

| Cyclic Shift Field in uplink-related DCI format | $n_{DMRS,\lambda}^{(2)}$ | | | | DMRS Configuration |
| --- | --- | --- | --- | --- | --- |
| | $\lambda = 0$ | $\lambda = 1$ | $\lambda = 2$ | $\lambda = 3$ | |
| 000 | 0 | 6 | 3 | 9 | No IFDMA |
| 001 | 6 | 0 | 9 | 3 | No IFDMA |
| 010 | 3 | 9 | 6 | 0 | No IFDMA |
| 011 | 4 | 10 | 7 | 1 | Odd subcarriers |
| 100 | 2 | 8 | 5 | 11 | Even subcarriers |
| 101 | 8 | 2 | 11 | 5 | Odd subcarriers |
| 110 | 10 | 4 | 1 | 7 | Even subcarriers |
| 111 | 9 | 3 | 0 | 6 | No IFDMA |

The remaining 4 cyclic shifts (correspond to 011, 100, 101, 110 in cyclic shift field), two cyclic shifts each should be reserved for IFDMA RPF-2 in odd and even subcarriers. The two code points within odd subcarriers are selected such that they have the highest minimum separation for the first layer, and they do not have overlapped cyclic shifts when supporting multi-layer sPUSCH transmissions. Based on the above rule, the pair (011, 101) can be reserved for IFDMA RPF-2 in odd subcarriers. The remaining code point pair (100, 110) which also satisfy the above rule can be reserved for IFDMA RPF-2 in even subcarriers.

Consider the IFMDA-based DMRS-multiplexing case shown in FIG. 24, and assume that both wireless device 1 and wireless device 2 are configured with two-layer uplink sTTI transmission. Based on Table 6, one way of signaling the DMRS configuration for wireless device 1 and wireless device 2 is to set the cyclic shift filed in UL UCI for wireless device 1 to 011, and set the cyclic shift filed for wireless device 2 to 100, to provide the best possible cyclic separation between different wireless devices and different transmission layers.

Thus, according to one aspect, a method in a network node 14 for configuring a wireless device 16 for multiplexing demodulation reference signals (DMRS) during short transmission time intervals (sTTIs) is provided. The method includes generating an indication of an interleaved frequency division multiple access (IFDMA) subcarrier configuration for DMRS transmission. The further includes transmitting to the wireless device 16 the indication of IFDMA subcarrier configuration.

According to this aspect, in some embodiments, the indication of the IFDMA subcarrier configuration specifies which subcarriers are to be used for DMRS transmission. In some embodiments, the indication of the IFDMA subcarriers is contained in downlink control information (DCI). In some embodiments, the IFDMA subcarrier configuration is indicated by a field indicating a cyclic shift. In some embodiments, the method further includes indicating whether a DMRS configuration is an IFDMA-based DMRS configuration. In some embodiments, a sTTI is one of 2 and 3 symbols duration. In some embodiments, the IFDMA has a repetition factor of 2. In some embodiments, a sTTI transmission is a short physical uplink shared channel, sPUSCH, transmission. In some embodiments, the method further includes determining one of whether only IFDMA-based DMRS multiplexing is used for sTTIs and whether both cyclic shift-based DMRS multiplexing and IFDMA-based DMRS multiplexing are used for sTTIs.

According to another aspect, a network node 14 for configuring a wireless device 16 for multiplexing demodulation reference signals (DMRS) during short transmission time intervals (sTTIs) is provided. The network node 14 includes processing circuitry 22 configured to generate an indication of an interleaved frequency division multiple access (IFDMA) subcarrier configuration for DMRS transmission. The network node 14 further includes a transceiver 28 configured to transmit to the wireless device 16 the indication of IFDMA, subcarrier configuration.

According to this aspect, in some embodiments, the indication of the IFDMA subcarrier configuration specifies which subcarriers are to be used for DMRS transmission. In some embodiments, the indication of the IFDMA subcarriers is contained in downlink control information (DCI). In some embodiments, the IFDMA subcarrier configuration is indicated by a field indicating a cyclic shift. In some embodiments, the processing circuitry 22 is further configured to indicate whether a DMRS configuration is an IFDMA-based DMRS configuration. In some embodiments, a sTTI is one of 2 and 3 symbols duration. In some embodiments, the IFDMA has a repetition factor of 2. In some embodiments, a sTTI transmission is a short physical uplink shared channel, sPUSCH, transmission. In some embodiments, the processing circuitry 22 is further configured to determine one of whether only IFDMA-based DMRS multiplexing is used for sTTIs and whether both cyclic shift-based DMRS multiplexing and IFDMA-based DMRS multiplexing are used for sTTIs.

According to yet another aspect, a network node 14 for configuring a wireless device 16 for multiplexing demodulation reference signals (DMRS) during short transmission time intervals (sTTIs) is provided. The network node 14 includes an IFDMA determination module 33 configured to generate an indication of an interleaved frequency division multiple access (IFDMA), subcarrier configuration for DMRS transmission. The network node 14 further includes a transceiver module 29 configured to transmit to the wireless device 16 the indication of IFDMA, subcarrier configuration.

According to another aspect, a method in a wireless device 16 for configuring demodulation reference signals (DMRS) during short transmission time intervals (sTTIs) is provided. The method includes receiving from a network node 14 an indication of an interleaved frequency division multiple access (IFDMA) subcarrier configuration for DMRS transmission. The method further include configuring DMRS transmissions according to the indication.

According to this aspect, in some embodiments, the indication of the IFDMA subcarrier configuration specifies which subcarriers are to be used for DMRS transmission. In some embodiments, the IFDMA subcarrier configuration is indicated by a field indicating a cyclic shift.

According to yet another aspect, a wireless device 16 for multiplexing demodulation reference signals (DMRS) during short transmission time intervals (sTTIs) is provided. The wireless device 16 includes a transceiver 52 configured to receive from a network node 14 an indication of an interleaved frequency division multiple access (IFDMA) subcarrier configuration for DMRS transmission. The wireless device 16 further includes processing circuitry 42 configured to configure DMRS transmissions according to the indication.

According to this aspect, in some embodiments, the indication of the IFDMA subcarrier configuration specifies which subcarriers are to be used for DMRS transmission. In some embodiments, the IFDMA subcarrier configuration is indicated by a field indicating a cyclic shift.

According to another aspect, a wireless device 16 for multiplexing demodulation reference signals (DMRS) during short transmission time intervals (sTTIs) is provided. The wireless device 16 includes a transceiver module 53 configured to receive from a network node 14 an indication of an interleaved frequency division multiple access, IFDMA, subcarrier configuration for DMRS transmission. The wireless device 16 further includes a DMRS configuration module 55 configured to configure DMRS transmissions according to the indication.

Some embodiments are as follows:

Embodiment 1

A method in a network node of signaling demodulation reference symbols, DMRS, configurations of uplink short transmission time interval, sTTI, transmissions, the signaling supporting multiplexing of DMRS of different wireless devices for uplink sTTIs, the method including:
  signaling a cyclic shift of the DMRS by using a legacy cyclic shift field in the uplink-related downlink control information, DCI, format; and
  reusing a legacy cyclic shift mapping table for short physical uplink shared channel transmissions.

Embodiment 2

The method of Embodiment 1, further comprising signaling a subcarrier configuration of DMRS transmission via a radio resource control, RRC, message.

Embodiment 3

The method of Embodiment 1, further comprising signaling a subcarrier configuration for DMRS transmission via a bit in the uplink-related DCI.

Embodiment 4

The method of Embodiment 1, wherein the cyclic shift is signaled by using the legacy cyclic shift field in the uplink-related DCI and the subcarrier configuration is implicitly indicated by a cyclic shift index.

Embodiment 5

The method of Embodiment 1, further comprising using radio resource control, RRC, messaging to indicate non-interleaved frequency division multiplexing, non-IFDMA, DMRS multiplexing.

Embodiment 6

The method of Embodiment 1, further comprising allocating partially overlapping frequencies to different wireless device.

Embodiment 7

The method of Embodiment 1, wherein a field in the uplink-related DCI is used to indicate non-interleaved frequency division multiplexing, non-IFDMA, DMRS multiplexing.

Embodiment 8

The method of Embodiment 1, wherein a legacy cyclic shift field is used to indicate non-interleaved frequency division multiplexing, non-IFDMA, DMRS multiplexing.

Embodiment 9

The method of Embodiment 1, wherein the DMRS configuration specifies at least one of odd subcarriers and even subcarriers.

Embodiment 10

A network node for signaling demodulation reference symbol, DMRS, configurations of uplink short transmission time interval, sTTI, transmissions, the signaling supporting multiplexing of DMRS of different wireless devices for uplink sTTIs, the network node comprising:
  processing circuitry including a memory and a processor:
  the memory configured to store downlink control information, DCI; and
  the processor configured to:
    signal a cyclic shift of the DMRS by a legacy cyclic shift field in the uplink-related downlink control information, DCI; and
    reuse a legacy cyclic shift mapping table for short physical uplink shared channel transmissions.

Embodiment 11

A network node for signaling demodulation reference symbol, DMRS, configurations of uplink short transmission time interval, sTTI, transmissions, the signaling supporting multiplexing of DMRS of different wireless devices for uplink sTTIs, the network node comprising:
  a memory module configured to store downlink control information, DCI;
  a signaling module configured to signal a cyclic shift of the DMRS by a legacy cyclic shift field in the uplink-related downlink control information, DCI; and
  a table reuse module configured to reuse a legacy cyclic shift mapping table for short physical uplink shared channel transmissions.

Embodiment 12

A method in a wireless device, the method comprising:
receiving signaling from a network node, the signaling including a cyclic shift of a demodulation reference symbol, DMRS; and
decoding the signaling to obtain the DMRS.

Embodiment 13

A wireless device, comprising:
a transceiver configured to receive signaling from a network node, the signaling including a cyclic shift of a demodulation reference symbol, DMRS;
processing circuitry including a memory and a processor:
the memory configured to store the DMRS; and
the processor configured to decode the signaling to obtain the DMRS.

Embodiment 14

A wireless device, comprising:
a transceiver module configured to receive signaling from a network node, the signaling including a cyclic shift of a demodulation reference symbol, DMRS;
a memory module configured to store the DMRS;
a decoding module configured to decode the signaling to obtain the DMRS.

Embodiment 15

A method performed by a network node of a wireless network, the method comprising:
signaling a demodulation reference symbol, DMRS, configuration for a wireless device in an uplink short TTI, sTTI, transmission, the DMRS configuration being usable by the wireless device and the network node, the DMRS configuration defining at least the cyclic shift and the subcarrier configuration for the DMRS transmission.

Embodiment 16

The method of Embodiment 15, wherein the sTTI has a predetermined duration in time and comprises resources on a number of OFDM or SC-FDMA symbols within a subframe.

Embodiment 17

A network node for a wireless network, the network node comprising:
processing circuitry, the processing circuitry being configured to.
signal a demodulation reference symbol, DMRS, configuration for a wireless device in an uplink short TTI, sTTI, transmission, the DMRS configuration being usable by the wireless device and the network node, the DMRS configuration defining at least the cyclic shift and the subcarrier configuration for the DMRS transmission.

Embodiment 18

The network node of Embodiment 17, wherein the sTTI has a predetermined duration in time and comprises resources on a number of OFDM or SC-FDMA symbols within a subframe.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node for configuring a wireless device for multiplexing demodulation reference signals, DMRS, during short transmission time intervals, sTTIs, the method comprising:
   generating an indication of an interleaved frequency division multiple access, IFDMA, subcarrier configuration for DMRS transmission; and
   transmitting to the wireless device the indication of IFDMA subcarrier configuration, the indication including a first field in an uplink downlink control information, UL DCI, and a second field in the UL DCI, the IFDMA subcarrier configuration being indicated at least by the first field indicating a cyclic shift, the second field being a single bit indicating whether a DMRS configuration is an IFDMA-based DMRS configuration.

2. The method of claim 1, wherein the indication of the IFDMA subcarrier configuration specifies which subcarriers are to be used for DMRS transmission.

3. The method of claim 1, wherein a sTTI is one of 2 and 3 symbols duration.

4. The method of claim 1, wherein the IFDMA has a repetition factor of 2.

5. The method of claim 1, wherein a sTTI transmission is a short physical uplink shared channel, sPUSCH, transmission.

6. The method of claim 1, further comprising determining one of whether only IFDMA-based DMRS multiplexing is used for sTTIs and whether both cyclic shift-based DMRS multiplexing and IFDMA-based DMRS multiplexing are used for sTTIs.

7. A network node for configuring a wireless device for multiplexing demodulation reference signals, DMRS, during short transmission time intervals, sTTIs, the network node comprising:
   processing circuitry configured to generate an indication of an interleaved frequency division multiple access, IFDMA, subcarrier configuration for DMRS transmission; and
   a transceiver configured to transmit to the wireless device the indication of IFDMA, subcarrier configuration, the indication including a first field in an uplink downlink control information, UL DCI, and a second field in the UL DCI, the IFDMA subcarrier configuration being indicated at least by the first field indicating a cyclic shift, the second field being a single bit indicating whether a DMRS configuration is an IFDMA-based DMRS configuration.

8. The network node of claim 7, wherein the indication of the IFDMA subcarrier configuration specifies which subcarriers are to be used for DMRS transmission.

9. The network node of claim 7, wherein a sTTI is one of 2 and 3 symbols duration.

10. The network node of claim 7, wherein the IFDMA has a repetition factor of 2.

11. The network node of claim 7, wherein a sTTI transmission is a short physical uplink shared channel, sPUSCH, transmission.

12. The network node of claim 7, further comprising determining one of whether only IFDMA-based DMRS multiplexing is used for sTTIs and whether both cyclic shift-based DMRS multiplexing and IFDMA-based DMRS multiplexing are used for sTTIs.

13. A method in a wireless device for configuring demodulation reference signals, DMRS, during short transmission time intervals, sTTIs, the method comprising:
   receiving from a network node an indication of an interleaved frequency division multiple access, IFDMA, subcarrier configuration for DMRS transmission and
   configuring DMRS transmissions according to the indication, the indication including a first field in an uplink downlink control information, UL DCI, and a second field in the UL DCI, the IFDMA subcarrier configuration being indicated at least by the first field indicating a cyclic shift and a, the second field being a single bit indicating whether a DMRS configuration is an IFDMA-based DMRS configuration.

14. The method of claim 13, wherein the indication of the IFDMA subcarrier configuration specifies which subcarriers are to be used for DMRS transmission.

15. A wireless device for multiplexing demodulation reference signals, DMRS, during short transmission time intervals, sTTIs, the wireless device comprising:
   a transceiver configured to receive from a network node an indication of an interleaved frequency division multiple access, IFDMA, subcarrier configuration for DMRS transmission; and
   processing circuitry configured to configure DMRS transmissions according to the indication, the indication including a first field in an uplink downlink control information, UL DCI, and a second field in the UL DCI, the IFDMA subcarrier configuration being indicated at least by the first field indicating a cyclic shift, the second field being a single bit indicating whether a DMRS configuration is an IFDMA-based DMRS configuration.

16. The wireless device of claim 15, wherein the indication of the IFDMA subcarrier configuration specifies which subcarriers are to be used for DMRS transmission.

* * * * *